United States Patent
Fujii et al.

(10) Patent No.: US 6,964,814 B2
(45) Date of Patent: Nov. 15, 2005

(54) TRANSPARENT FILM

(75) Inventors: Sadao Fujii, Kobe (JP); Toshihiko Hikida, Settsu (JP); Shigeru Tanaka, Kobe (JP); Hirosuke Kawabata, Kobe (JP); Hiroshi Awaji, Kobe (JP)

(73) Assignee: Kaneka Corporation, Osaka (JP)

(*) Notice: Subject to any disclaimer, the term of this patent is extended or adjusted under 35 U.S.C. 154(b) by 0 days.

(21) Appl. No.: 11/006,581

(22) Filed: Dec. 8, 2004

(65) Prior Publication Data

US 2005/0096431 A1 May 5, 2005

Related U.S. Application Data

(63) Continuation of application No. 09/869,864, filed as application No. PCT/JP00/07982 on Nov. 10, 2000, now abandoned.

(30) Foreign Application Priority Data

| Nov. 12, 1999 | (JP) | ............................................ 11-322448 |
| Mar. 30, 2000 | (JP) | ........................................ 2000-094903 |
| Mar. 30, 2000 | (JP) | ........................................ 2000-094904 |
| Apr. 28, 2000 | (JP) | ........................................ 2000-131450 |
| Apr. 28, 2000 | (JP) | ........................................ 2000-131451 |
| May 30, 2000 | (JP) | ........................................ 2000-160251 |
| May 31, 2000 | (JP) | ........................................ 2000-163414 |
| May 31, 2000 | (JP) | ........................................ 2000-163415 |
| May 26, 2000 | (JP) | ........................................ 2000-156808 |
| Jul. 28, 2000 | (JP) | ........................................ 2000-229765 |

(51) Int. Cl.[7] ........................ B32B 27/00; C08L 25/12; C08L 35/00; C08J 5/18

(52) U.S. Cl. ................... 428/423.1; 428/411.1; 428/424.7; 428/220; 428/215; 428/474.4; 525/178; 525/205; 525/207; 264/212; 427/163

(58) Field of Search .......................... 428/411.1, 423.1, 428/424.7, 220, 215; 427/163; 264/212; 525/178, 205, 207

(56) References Cited

U.S. PATENT DOCUMENTS

| 4,246,374 A | 1/1981 | Kopchik |
| 4,374,951 A | 2/1983 | Lee, deceased et al. |
| 4,381,373 A | 4/1983 | Ikuma |
| 4,727,117 A | 2/1988 | Hallden-Abberton et al. |
| 5,306,794 A | 4/1994 | Doi et al. |
| 5,536,798 A | 7/1996 | Doi et al. |
| 5,580,928 A | 12/1996 | Doi et al. |
| 5,736,241 A | 4/1998 | Inoue et al. |
| 5,972,519 A | 10/1999 | Niessner et al. |

FOREIGN PATENT DOCUMENTS

| JP | 02-153904 | 6/1990 |
| JP | 05-059131 | 3/1993 |
| JP | 06-136058 | 5/1994 |
| JP | 09-328523 | 12/1997 |
| JP | 2000 080239 | 3/2000 |
| JP | 2000-080240 | 3/2000 |
| JP | 2004-090415 | * 3/2004 |

* cited by examiner

*Primary Examiner*—P. Hampton Hightower
(74) *Attorney, Agent, or Firm*—Foley & Lardner LLP

(57) ABSTRACT

A film is provided which comprises a thermoplastic resin A having a substituted or non-substituted imide group at a side chain of the resin A, and a thermoplastic resin B having a substituted or non-substituted phenyl group and a nitrile group at a side chain of the resin B. The film has a retardation value of 0 to 1000 nm, a light transmission of 85% or more, and a haze of 2% or less.

16 Claims, No Drawings

TRANSPARENT FILM

This application is a Continuation of application Ser. No. 09/869,864, filed Aug. 28, 2001 now abandoned, which is a National Stage Application of PCT/JP00/07982, filed Nov. 10, 2000, which claims priority from Japanese Application Nos. 11-322448, filed Nov. 12, 1999; 2000-094903, filed Mar. 30, 2000; 2000-094904, filed Mar. 30, 2000; 2000-131450, filed Apr. 28, 2000; 2000-131451, filed Apr. 28, 2000; 2000-156808, filed May 26, 2000; 2000-160251, filed May 30, 2000; 2000-163414; filed May 31, 2000; 2000-163415, filed May 31, 2000; and 2000-229765, filed Jul. 28, 2000. The entire contents of each of the aforementioned applications are incorporated herein by reference.

TECHNICAL FIELD

The present invention relates to a transparent optical film. More particularly, the present invention relates to a film having excellent optical characteristics and useful in various optical applications. Specifically, in one aspect, the present invention relates to a retardation film. In another aspect, the present invention relates to a film which does not substantially have a retardation. The film which does not substantially have a retardation is useful as a polarizer protection film or the like.

BACKGROUND ART

Conventional Technology

Recently, electronics devices are becoming smaller and smaller. As representatively found in notebook computers, word processors, portable telephones and personal digital assistants, liquid crystal displays which are advantageously light and compact are often used in such electronics devices. In these liquid crystal display devices, various films (e.g., a polarization film) are used to ensure display quality. In applications such as personal digital assistants or portable telephones, a plastic liquid crystal display device employing a resin film in place of a glass substrate is practically used.

A resin film used in a device handling with polarized light, such as a liquid crystal display device, needs to be not only optically transparent but also optically uniform. In the case of a film substrate used in a plastic liquid crystal display device, a retardation represented by a product of the birefringence and thickness of the film substrate not only needs to be small, but also needs to be unlikely to be changed even when external stress is applied.

In the case of a resin film, it has been found that polarization and alignment of resin molecules in the film involve a retardation. To obtain a film having a small retardation requires the use of a resin having small polarization. Further, conditions under which such a film is produced need to be regulated in such a manner as to suppress alignment of molecules as much as possible.

In general, engineering plastic resins such as polycarbonate, polyarylate, polysulfone, and polyethersulfone, and celluloses such as triacetylcellulose are known as resin for film. When these resins are used to produce a film, a variety of stress is applied on a film being formed. Such stress is caused by: a back pressure used to flow a melted resin; shrinkage of the resin as the solvent is dried or heat shrinkage of the resin; the tension of the film as it is being conveyed; or the like. The stress causes the molecules in the film to be aligned, so that a retardation is very likely to remain in the film.

To solve the above-described problems, an attempt has been made to use a resin having small polarization to obtain a film. For example, an attempt has been made to use an olefin resin such as, typically, a cycloolefin resin to produce a film.

The range of applications of retardation films is becoming more and more widespread. A higher level of performance is required for the retardation films as the films are more and more widely used. The wavelength dependence of a retardation has received attention as a particularly important feature. The wavelength dependence of a retardation is generally defined as Re(400)/Re(550) where Re(400) represents a retardation of a film measured using monochromatic light having a wavelength of 400 nm, and Re(550) represents a retardation of the film measured using monochromatic light having a wavelength of 550 nm. A value defined by Re(400)/Re(550) is herein called wavelength dependence unless otherwise specified.

In an STN liquid crystal display device, for example, an appropriate wavelength dependence is desired for a retardation film for use in color compensation.

On the other hand, a film used in a quarter-wave plate or a half-wave plate is desired to have a retardation corresponding to ¼ or ½ of wavelength with respect to all the wavelengths of visible light. However, a conventional retardation film of polycarbonate has a large wavelength dependence of 1.16 and a large alignment retardation (described later) of 1400. In other words, the magnitude of polarization varies depending on wavelength. Assuming that such a retardation film having a large wavelength dependence is used in a reflection TFT liquid crystal display device, contrast is significantly deteriorated when a black display is performed in the liquid crystal display device.

Problems to be Solved by the Invention

A film of an engineering plastic resin, such as the above-described polycarbonate, has a retardation. Therefore, a remaining retardation needs to be reduced by providing a special process such as heating and annealing such a film.

Even when a film having a reduced retardation is produced in this way, a retardation is often exhibited again since subsequent handling with the film leads to alignment of molecules. For example, when the film and a polarization plate are laminated to each other, the polarization plate is often deformed. If the polarization plate is deformed, stress is generated. The stress causes alignment of molecules, leading to exhibition of a retardation. Therefore, the above-described film needs to be carefully handled. Despite the careful handling, the yield (i.e., the probability that an end product having a small retardation is obtained) is disadvantageously low.

In particular, it is known that when the above-described film is used as a polarizer protection film, the stress as the polarizer shrinks causes exhibition of a retardation which is undesirable for a film. Such a retardation has an adverse influence on the polarization performance of a polarization film.

The above-described film is produced by various production methods. One of the methods is a solvent cast method. A film produced by the solvent cast method has a relatively small retardation in a plane of the film. However, the film produced by the solvent cast method has a large retardation in a thickness direction of the film due to birefringence generated by alignment of molecules, so that the viewing angle characteristic of the film is likely to be adversely reduced.

Alternatively, a retardation film may be obtained by stretching. When a retardation film is obtained by stretching, a retardation varies due to a small variation in tension generated by a stretching device. Moreover, when the retardation film obtained by stretching is laminated to a polarizer or the like, a retardation is likely to be changed due to tension generated by the lamination. Thus, the desired value is unlikely to be maintained. Moreover, stress is likely to be generated due to, for example, shrinkage of the polarization plate after the lamination so that a retardation value is likely to be adversely changed.

Further, the wavelength dependence of a retardation is dependent only on the materials of the retardation film. The required wavelength dependence differs from application to application. To obtain different wavelength dependence, a different material needed to be selected. Therefore, a new material disadvantageously needed to be found for an application requiring a different wavelength dependence.

Furthermore, the above-described film is often laminated to a glass or another film. However, in the case of a film made of a resin having small polarization, such as olefin type resin, such a film has a poor adhesion strength to glues or adhesives. Therefore, a special adhesive is often required for the film. Moreover, surface treatment is often required for the film.

DISCLOSURE OF THE INVENTION

Means for Solving the Problems

The inventors have vigorously studied in order to solve the above-described problems. As a result, the inventors have found that the above-described problems can be solved using a composition of a polymer having a specific structure and composition. It has been revealed that a retardation is unlikely to occur in a film of such a polymer and the retardation and wavelength dependence of the obtained film can be controlled by adjusting the composition ratio of the polymer. Thus, the present invention has been completed.

That is, according to the present invention, a transparent film is provided comprising: (A) a thermoplastic resin having a substituted or non-substituted imide group at a side chain of the resin; and (B) a thermoplastic resin having at least a substituted or non-substituted phenyl group and a nitrile group at a side chain of the resin. Note that a thermoplastic resin having a substituted or non-substituted imide group at a side chain thereof is herein referred to as "thermoplastic resin A", while a thermoplastic resin having a substituted or non-substituted phenyl group and a nitrile group at a side chain thereof is herein referred to as "thermoplastic resin B".

In the film of the present invention, a retardation value of the film is from 0 to 1000 nm, a light transmission of the film is 85% or more, and a haze of the film is 2% or less.

In a preferred embodiment, the transparent film of the present invention has an alignment retardation value of the film is 300 nm or less. Further, the transparent film of the present invention has a folding endurance of 30 times or more. Furthermore, the transparent film of the present invention has a tear propagation strength of 150 gf/mm or more. More preferably, the transparent film of the present invention has both a folding endurance of 30 times or more and a tear propagation strength of 150 gf/mm or more.

In an especially preferred embodiment, the thermoplastic resin A is a copolymer consisting of a repeating unit represented by the following formula (1), and another repeating unit represented by the following formula (2):

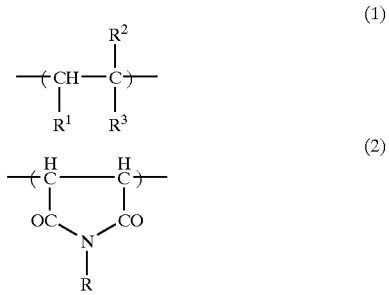

(in formula (1), $R^1$, $R^2$ and $R^3$ independently indicate a hydrogen atom or an alkyl group having 1 to 8 carbon atoms) (in formula (2), R indicates an alkyl group having 1 to 18 carbon atoms or a cycloalkyl group having 3 to 12 carbon atoms), and the content of the thermoplastic resin A is 60 to 90% by weight with reference to the weight of overall resins in the film.

In the present invention, the thermoplastic resin B is preferably a copolymer of a substituted or non-substituted acrylonitrile and a substituted or non-substituted styrene, containing 20 to 50% by weight of a substituted or non-substituted acrylonitrile repeating unit and 50 to 80% by weight of a substituted or non-substituted styrene repeating unit.

The above-described transparent film is preferably produced by dissolving the resin composition of the present invention in an organic solvent, and thereafter flow-expanding the solution on a support, and drying the solution.

More specifically, the transparent film of the present invention comprises: (A) a thermoplastic resin having a substituted or non-substituted imide group at a side chain of the resin; and (B) a thermoplastic resin having a substituted or non-substituted phenyl group and a nitrile group at a side chain of the resin, in which a retardation value of the film is from 0 to 1000 nm, a light transmission of the film is 85% or more, and a haze of the film is 2% or less.

In one embodiment, the thermoplastic resin A consists of an olefin repeating unit, and a repeating unit having a substituted or non-substituted imide group at a side chain of the resin.

In one embodiment, the retardation value of the film is less than 20 nm.

In one embodiment, the retardation value of the film is 20 nm or more.

In one embodiment, the alignment retardation value of the film is 300 nm or less.

In one embodiment, the film is a stretched film.

In one embodiment, the folding endurance of the film is 30 times or more in at least one direction in a plane of the film.

In one embodiment, the tear propagation strength of the film is 150 gf/mm or more in at least one direction in a plane of the film.

In one embodiment, the surface energy of at least one surface of the film is 50 dyne/cm or more.

In one embodiment, the retardation of the film in the thickness direction of the film is 50 nm or less.

In one embodiment, the thermoplastic resin A includes a repeating unit represented by the following formula (1), and another repeating unit represented by the following formula (2):

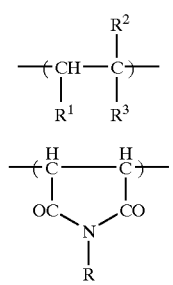

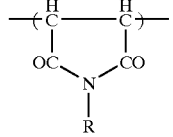

(where $R^1$, $R^2$ and $R^3$ independently indicate a hydrogen atom or an alkyl group having 1 to 8 carbon atoms, and R indicates an alkyl group having 1 to 18 carbon atoms or a cycloalkyl group having 3 to 12 carbon atoms), and where the content of the thermoplastic resin A is 50 to 90% by weight with reference to the weight of overall resins in the film.

In one embodiment, the thermoplastic resin B has a substituted or non-substituted acrylonitrile repeating unit and a substituted or non-substituted styrene repeating unit, where the substituted or non-substituted acrylonitrile repeating unit is 20 to 50% by weight of the thermoplastic resin B, and the substituted or non-substituted styrene repeating unit is 50 to 80% by weight of the thermoplastic resin B.

According to another aspect of the present invention, a method is provided for producing the above-described film. The method comprises the steps of: flow-expanding a solution containing the thermoplastic resin A and the thermoplastic resin B on a support; and drying the solution.

According to still another aspect of the present invention, an elliptical polarization plate comprising the above-described retardation film and a polarization plate is provided, in which the film and the polarization plate are laminated.

According to still another aspect of the present invention, a circular polarization plate comprising the above-described retardation film and a polarization plate is provided, in which the film and the polarization plate are laminated.

According to still another aspect of the present invention, a polarization plate comprising a polarizer and a protection film protecting at least one side of the polarizer is provided, in which the protection film is the above-described film.

BEST MODE FOR CARRYING OUT THE INVENTION

Embodiments of the Invention

A film according to the present invention is made of a resin composition comprising: (A) a thermoplastic resin A having a substituted or non-substituted imide group at a side chain of the resin A and (B) a thermoplastic resin B having at least a substituted or non-substituted phenyl group and a nitrile group at a side chain of the resin B.

Preferably, the film of the present invention is made only of the thermoplastic resins A and B. However, a third resin may be optionally used in addition to the thermoplastic resins A and B.

Note that when the thermoplastic resin A is a copolymer resin, the copolymer resin is also herein called "thermoplastic copolymer A", and when the thermoplastic resin B is a copolymer resin, the copolymer resin is also herein called "thermoplastic copolymer B".

(Thermoplastic Resin A)

The thermoplastic resin A used in the present invention has a substituted or non-substituted imide group at a side chain thereof. A principal chain of the thermoplastic resin A may be an arbitrary thermoplastic resin principal chain. For example, the principal chain may consist only of carbon atoms, or in such a principal chain there may be an atom(s) other than carbon inserted between the carbon atoms. Alternatively, the principal chain may consist of atoms other than carbon atoms. Preferably, the principal chain may consist only of carbon atoms. For example, the principal chain may be a hydrocarbon or a substituted product thereof. Specifically, the principal chain may be obtained by addition polymerization. Specifically, the principal chain is polyolefin or polyvinyl.

The principal chain may be obtained by condensation polymerization. For example, the principal chain may be obtained by ester bond, amide bond, or the like.

Preferably, the principal chain has a polyvinyl backbone obtained by polymerization of a substituted vinyl monomer.

A substituted or non-substituted imide group can be introduced into the thermoplastic resin A using an arbitrary method conventionally known. For example, a monomer having a substituted or non-substituted imide group may be polymerized to obtain the thermoplastic resin having the substituted or non-substituted imide group. Alternatively, for example, a variety of monomers can be polymerized to form the principal chain, followed by introduction of a substituted or non-substituted imide group into a side chain. For example, a compound having a substituted or non-substituted imide group may be graft-copolymerized into a side chain.

When the imide group is substituted with a substituent, the substituent can be a conventionally known substituent which can be substituted for a hydrogen of the imide group. Specifically, for example, the substituent is an alkyl group or the like.

Preferably, the thermoplastic resin A is a copolymer including a repeating unit derived from at least one olefin (alkene) and another repeating unit having at least one type of substituted or non-substituted maleimide structure (two or more component copolymer (multi-component polymer)).

The above-described olefin-maleimide copolymer can be synthesized by a known method. For example, as described in Japanese Laid-Open Publication No. 5-59193, Japanese Laid-Open Publication No. 5-195801, Japanese Laid-Open Publication No. 6-136058 and Japanese Laid-Open Publication No. 9-328523, the olefin-maleimide copolymer can be obtained by a variety of methods: a method of directly copolymerizing two types of monomers; a method of polymerizing one type of monomers and graft-copolymerizing another type of monomer with the resultant polymer; and a method of introducing the imide bond into a precursor polymer (described later) due to polymer reaction; and the like.

More preferably, the thermoplastic resin A includes a repeating unit(s) derived from at least one olefin (alkene) and represented by the following formula (1), and another repeating unit(s) having at least one type of substituted or non-substituted maleimide structure and represented by the following formula (2).

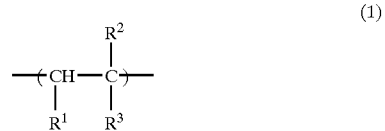

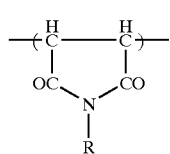

(2)

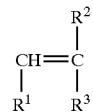

(3)

(in formula (1), $R^1$, $R^2$, and $R^3$ independently indicate a hydrogen atom or an alkyl group having 1 to 8 carbon atoms. The number of carbons in the alkyl group is preferably 1 to 4, more preferably 1 to 2, even more preferably 1.) (in formula (2), R indicates a hydrogen atom, an alkyl group having 1 to 18 carbon atoms, or a cycloalkyl group having 3 to 12 carbon atoms. The number of carbons in the alkyl group is preferably 1 to 4, more preferably 1 to 2, even more preferably 1. The number of carbons in the cycloalkyl group is preferably 3 to 9, and more preferably 4 to 7.)

Here, the content of the repeating unit having formula (1) is preferably 20 to 70% by mole with reference to the overall repeating units of the thermoplastic resin A, more preferably 40 to 60% by mole, and even more preferably 45 to 55% by mole.

The content of the repeating unit having formula (2) is preferably 30 to 80% by mole with reference to the overall repeating units of the thermoplastic resin A, more preferably 40 to 60% by mole, and even more preferably 45 to 55% by mole. When the content of the repeating unit having formula (2) is excessively small or large, the obtained film is likely to have reduced heat resistance and mechanical strength.

Preferably, the thermoplastic resin A includes the repeating units having formulas (1) and (2) as major components. In one embodiment, the overall repeating units having formulas (1) and (2) are 50% by mole or more of the thermoplastic resin A, preferably 70% by mole or more, more preferably 80% by mole or more, and even more preferably 90% by mole or more. In a preferable embodiment, the overall repeating units having formulas (1) and (2) are 100% by mole. However, a third repeating unit described later may be optionally used.

When the third repeating unit is used, the content of the third repeating unit is preferably 30% by mole or less with reference to the overall repeating units of the thermoplastic copolymer resin A, more preferably 20% by mole or less, even more preferably 15% by mole or less, and especially preferably 10% by mole or less. When the content of the third repeating unit is excessively large, the performance of the repeating units represented by formulas (1) and (2) is likely to be insufficient.

Further, when the third repeating unit is used, the content of the third repeating unit is preferably 1% by mole or more with reference to the overall repeating units of the thermoplastic copolymer resin A, more preferably 2% by mole or more, even more preferably 3% by mole or more, and especially preferably 5% by mole or more. When the content of the third repeating unit is excessively small, the performance of the third repeating unit is likely to be insufficient with respect to the whole composition.

Note that when the third repeating unit is used, the ratio of the repeating unit (1) to (2) is preferably the same as that when the third repeating unit does not exist.

(Repeating Unit Having Formula (1))

The repeating unit having formula (1) (i.e., olefin unit) is obtained from olefin represented by the following formula (3):

(wherein $R^1$, $R^2$ and $R^3$ are the same as those in formula (1)).

Examples of a preferable olefin type monomer include isobutene, 2-methyl-1-butene, 2-methyl-1-pentene, 2-methyl-1-hexene, 2-methyl-1-heptene, 2-methyl-1-heptene, 1-isooctene, 2-methyl-1-octene, 2-ethyl-1-pentene, 2-ethyl-2-butene, 2-methyl-2-pentene, and 2-methyl-2-hexene, etc. Isobuten is most preferable. These olefins may be used alone or a combination of two or more thereof may be used.

(Repeating Unit Having Formula (2))

The repeating unit having formula (2) (maleimide unit) can be derived from a corresponding maleimide compound. Such a maleimide compound is represented by the following formula (4):

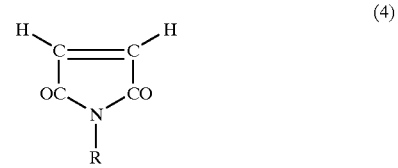

(4)

(wherein R is the same as that in formula (2)).

Preferable examples of such a maleimide compound include maleimide, and N-substituted maleimide, such as N-methylmaleimide, N-ethylmaleimide, N-n-propylmaleimide, N-i-propylmaleimide, N-n-butylmaleimide, N-s-butylmaleimide, N-t-butylmaleimide, N-n-pentylmaleimide, N-n-hexylmaleimide, N-n-heptylmaleimide, N-n-octylmaleimide, N-laurylmaleimide, N-stearylmaleimide, N-cyclopropylmaleimide, N-cyclobutylmaleimide, N-cyclopentylmaleimide, N-cyclohexylmaleimide, N-cycloheptylmaleimide, and N-cyclooctylmaleimide. N-methylmaleimide is most preferable.

Those maleimide compounds may be used alone or a combination of two or more thereof may be used. As a maleimide compound, N-substituted maleimide is preferable. Specifically, in formula (4), a very preferable compound has R which is a group other than a hydrogen atom. Examples of such a compound include N-methylmaleimide. In the N-substituted maleimide, examples of a preferable N substitutent include methyl, ethyl, n-propyl, i-propyl, n-butyl, i-butyl, s-butyl, t-butyl, n-pentyl, n-hexyl, n-heptyl, n-octyl, lauryl, stearyl, cyclopropyl, cyclobutyl, and cyclohexyl, etc.

(Third Repeating Unit)

In addition to the above-described olefin and maleimide units, the thermoplastic copolymer A used in the present invention can include one or more types of monomers capable of copolymerization as the third repeating unit. For example, a vinyl type monomer can be included. Examples of such a monomer capable of copolymerization include: an acrylic acid type monomer such as methyl acrylate and butyl acrylate; a methacrylic acid type monomer such as methyl mathacrylate and cyclohexyl methacrylate; a vinylester monomer such as vinyl acetate; a vinyl monomer such as a vinyl ether monomer (e.g., methyl vinyl ether); acid anhydride having unsaturated double bond (e.g., maleic anhydride); and a substituted or non-substituted styrene monomer such as styrene, α-methylstyrene, and p-methoxy styrene. These third repeating units may be used alone or a combination of two or more thereof may be used as the third repeating unit. When the third repeating unit is included in the thermoplastic copolymer A to such an extent as not to reduce the optical characteristics of a film, the heat resistance or mechanical strength of the thermoplastic copolymer A can be improved.

(Polymerization Method of Thermoplastic Resin A)

The thermoplastic resin A can be, for example, produced by polymerizing the above-described olefin and maleimide compounds using a known polymerization method. Such a known polymerization method includes graft polymerization. Alternatively, the thermoplastic resin A can be produced by polymerizing the above-described olefin and maleic acid or maleic anhydride using a routine method to form a precursor polymer which is in turn reacted with an amine compound to cause the maleic anhydride portion of the precursor polymer to become imide. The precursor polymer may optionally include the above-described third repeating unit. Alternatively, the precursor polymer may include non-substituted or substituted maleimide. In this case, examples of an amine compound used include an amine corresponding to the imide portion of the maleimide unit in formula (2). More specifically, an amine compound represented by formula R—NH$_2$ (R is the same as that in formula (2)). Examples of such a preferably usable amine compound include: alkylamine such as methylamine, ethylamine, n-propylamine, i-propylamine, n-butylamine, s-butylamine, t-butylamine, and cyclohexyl amine: ammonia; dimethylurea; and diethylurea. In this case, a thermoplastic resin having the repeating units of formulas (1) and (2) is also obtained.

The thermoplastic copolymer A used in the present invention may be any of random copolymer, block copolymer graft copolymer, and alternating copolymer. Alternating copolymers are preferable. More preferably, the thermoplastic copolymer A includes: as a maleimide unit, at least one type of maleimide unit in which R of formula (2) is an alkyl group selected from a methyl group, an ethyl group, an isopropyl group and a cyclohexyl group; and as an olefin unit, at least one type of olefin unit in which R$^1$ in formula (1) is a hydrogen atom and R$^2$ and R$^3$ each are a methyl group. These production methods are described in Japanese Laid-Open Publication Nos. 5-59193, 5-195801, 6-136058 and 9-328523, for example.

Herein, when the term "unit" is used to indicate a monomer, the term "unit" means a residue of the monomer remaining after polymerization. Specifically, the term "maleimide unit" means a residue of one maleimide molecule after polymerization. Similarly, the term "olefin unit" means a residue of one olefin monomer after polymerization.

More preferably, the thermoplastic copolymer A includes an N-methylmaleimide unit as the maleimide unit and an isobutylene unit as the olefin unit. The thermoplastic copolymer A is especially preferably an alternating copolymer of N-substituted maleimide and isobutene.

The thermoplastic resin A preferably has a weight-average molecular weight of 1×10$^3$ or more, and more preferably 1×10$^4$ or more.

The thermoplastic resin A preferably has a weight-average molecular weight of 5×10$^6$ or less, and more preferably 5×10$^5$ or less.

The glass-transition temperature of the thermoplastic copolymer A is preferably 80° C. or more in terms of heat resistance, more preferably 100° C. or more, and even more preferably 130° C. or more.

Alternatively, a glutarimide type thermoplastic resin can be preferably used as the thermoplastic resin A having a substituted or non-substituted imide group at a side chain thereof. The glutarimide type resin has a glutarimide structure unit and a methyl acrylate or methyl methacrylate structure unit as described in Japanese Laid-Open Publication No. 2-153904.

A glutarimide type resin having a repeating unit represented by the following formula (5) is preferably used:

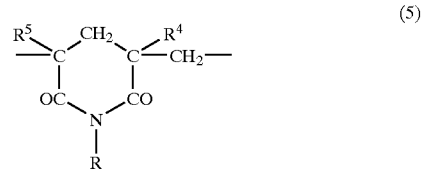

(where R$^4$ is a hydrogen atom or methyl and R$^5$ is an hydrogen atom, or an alkyl group, cycloalkyl group or aryl group having 1 to 8 carbon atoms).

In the thermoplastic resin A, for example, the glutarimide type resin may be optionally copolymerized with a third monomer. Preferable examples of the third monomer include: an acryl type monomer such as butylacrylate; a styrene type monomer such as styrene, substituted styrene, or α-methylstyrene; a nitrile type monomer such as acrylonitrile or methacrylonitrile, and a maleimide type monomer such as maleimide, N-methylmaleimide or N-phenylmaleimide. These third monomers maybe copolymerized with the glutarimide type resin directly or by graft copolymerization with the glutarimide type resin.

A preferable content of an imide group (i.e., the abundance ratio of a repeating unit having the imide group) is 40 to 80% by mole of the overall repeating units in the thermoplastic resin A. Examples of the above-described glutarimide type resin are described, for example, in U.S. Pat. No. 4,246,374 and the like.

A film obtained using the above-described thermoplastic resin A has a relatively poor flexibility and therefore tends to tear. Among the above-described thermoplastic resins A, a film of an isobutylene-substituted maleimide type copolymer has a significantly poor flexibility and tends to be torn. However, when the thermoplastic resin A is blended with the thermoplastic resin B (e.g., an acrylonitrile-styrene type copolymer), the mechanical property of a film can be improved.

(Thermoplastic Resin B)

The thermoplastic resin B used in the present invention has a substituted or non-substituted phenyl group and a nitrile group at a side chain thereof. In this case, the principal chain of the thermoplastic resin B may be an arbitrary thermoplastic resin principal chain. For example, the principal chain may consist only of carbon atoms, or in such a principal chain there may be an atom(s) other than carbon inserted between the carbon atoms. Alternatively, the principal chain consists of atoms other than carbon atoms. Preferably, the principal chain may consist only of carbon atoms. For example, the principal chain is a hydrocarbon or a substituted product thereof. Specifically, for example, the principal chain may be obtained by addition polymerization. Specifically, the principal chain is polyolefin or polyvinyl.

Further, the principal chain may be obtained by condensation polymerization. For example, the principal chain may be obtained by ester bond, amide bond, or the like.

Preferably, the principal chain has a polyvinyl backbone obtained by polymerization of a substituted vinyl monomer.

A substituted or non-substituted phenyl group can be introduced into the thermoplastic resin B using an arbitrary method conventionally known. For example, a monomer having a substituted or non-substituted phenyl group may be polymerized to obtain the thermoplastic resin having the substituted or non-substituted phenyl group. Alternatively, for example, a variety of monomers are polymerized to form a principal chain, followed by introduction of a substituted or non-substituted phenyl group into a side chain thereof. For example, a compound having a substituted or non-substituted phenyl group may be graft-copolymerized into a side chain of the resin B.

When the phenyl group is substituted with a substituent, the usable substituent can be a conventionally known substituent which can substitute for a hydrogen of the phenyl group. Conventionally known substitution positions can be used. Specifically, for example, the substituent is an alkyl group or the like.

A nitrile group can be introduced into the thermoplastic resin B using an arbitrary method conventionally known. For example, a monomer having a nitrile group may be polymerized to obtain the thermoplastic resin having the nitrile group. Alternatively, for example, a variety of monomers are polymerized to form a principal chain, followed by introduction of a nitrile group into a side chain of the resin B. For example, a compound having a nitrile group may be graft-copolymerized into a side chain of the resin B.

Preferably, the thermoplastic resin B is a copolymer including a repeating unit derived from an unsaturated nitrile compound (nitrile unit) and another repeating unit derived from a styrene type compound (styrene unit) (two or three or more component copolymer (multi-component polymer)). Preferably, an acrylonitrile-styrene type copolymer can be used.

(Nitrile Compound)

As the unsaturated nitrile compound, an arbitrary compound having a cyano group and a reactive double bond can be used. Preferable examples of the unsaturated nitrile compound vary depending on the thermoplastic resins A and B used.

Preferable examples of the unsaturated nitrile compound included in the above-described preferable thermoplastic copolymer B include: α-substituted unsaturated nitrile such as acrylonitrile and methacrylonitrile; and a nitrile compound having an. α,β-double substituted olefinic unsaturated bond, such as fumaronitrile.

(Styrene Type Compound)

As the styrene type compound, an arbitrary compound having a phenyl group and a reactive double bond can be used. Preferable examples of the styrene type compound vary depending on the thermoplastic resins A and B used.

Preferable examples of the styrene type compound included in the above-described preferable thermoplastic copolymer B include: a non-substituted or substituted styrene type compound such as styrene, vinyltoluene, methoxystyrene, or chlorostyrene; and an α-substituted styrene type compound such as α-methylstyrene.

In an especially preferable embodiment, the thermoplastic resin B includes an unsaturated nitrile unit represented by the following formula (6) and a styrene type unit represented by the following formula (7).

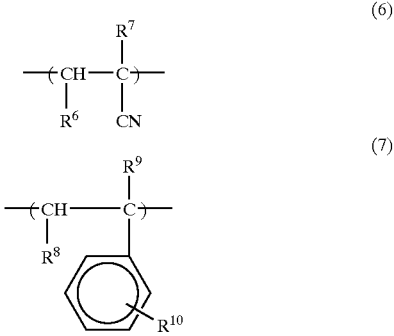

(in formula (6), $R^6$ and $R^7$ independently each represent a hydrogen atom or an alkyl group having 1 to 8 carbon atoms. The number of carbons in the alkyl group is preferably 1 to 4, more preferably 1 to 2.)

(in formula (7), $R^8$ and $R^9$ independently each represent a hydrogen atom or an alkyl group having 1 to 8 carbon atoms, $R^{10}$ represents a hydrogen atom, an alkyl group having 1 to 8 carbon atoms, a halogen atom, a hydroxyl group, an alkoxy group, or a nitro group. The number of carbons in the alkyl group is preferably 1 to 4, more preferably 1 to 3, and even more preferably 1 to 2. The number of carbons in the alkoxy group is preferably 1 to 20, more preferably 1 to 8, and even more preferably 1 to 4.)

Preferable examples of the unsaturated nitrile compound included in the above-described preferable thermoplastic copolymer B include α-substituted unsaturated nitrile and a nitrile compound having an α, β-double substituted olefinic unsaturated bond. Examples of α-substituted unsaturated nitrile include acrylonitrile and methacrylonitrile. Examples of the nitrile compound having an α,β-double substituted olefinic unsaturated bond include fumaronitrile. More preferably, the unsaturated nitrile compound is acrylonitrile.

Preferable examples of the styrene type compound included in the above-described thermoplastic copolymer B include a non-substituted or substituted styrene type compound and an α-substituted styrene type compound. Examples of the non-substituted or substituted styrene type compound include styrene, vinyltoluene, methoxystyrene, and chlorostyrene. Examples of the α-substituted styrene type compound include α-methylstyrene, etc. More preferably, the styrene type compound is styrene.

The content of the repeating unit of formula (6) is preferably 10 to 70% by weight with reference to the overall repeating units of the thermoplastic resin B, more preferably 20 to 60% by weight, even more preferably 20 to 50% by weight, still even more preferably 20 to 40% by weight, and most preferably 20 to 30% by weight.

The content of the repeating unit of formula (7) is preferably 30 to 70% by weight with reference to the overall repeating units of the thermoplastic resin B, more preferably 40 to 80% by weight, even more preferably 50 to 80% by weight, still even more preferably 60 to 80% by weight, and most preferably 70 to 80% by weight.

When the repeating unit of formula (6) is 20 to 30% by weight and the repeating unit of formula (7) is 70 to 80% by weight, a very preferable result is obtained.

When the content of the styrene type repeating unit or nitrile type repeating unit is excessively large, the compatibility of the thermoplastic resin B with the thermoplastic resin A becomes poor, so that the transparency of an obtained film is likely to be reduced and the haze thereof is likely to be large.

Particularly preferably, the thermoplastic copolymer B includes the unsaturated nitrile unit and the styrene type unit as major components. The overall unsaturated nitrile unit and styrene type unit are preferably 70% by weight or more of the thermoplastic copolymer B, more preferably 80% by weight or more, even more preferably 90% by weight or more, and especially preferably 95% by weight or more. Of course, the overall unsaturated nitrile unit and styrene type unit may be 100% by weight.

Especially preferably, the thermoplastic copolymer B includes the unsaturated nitrile unit and the styrene type unit as major components. In one preferable embodiment, the overall repeating units of formulas (6) and (7) is 100% by weight. The overall unsaturated nitrile unit and styrene type units are 70% by weight or more of the thermoplastic resin B, more preferably 80% by weight or more, even more preferably 90% by weight or more, and especially preferably 95% by weight or more. However, a third repeating unit described later may be optionally used.

(Third Repeating Unit)

In addition to the above-described nitrile unit and styrene type unit, the thermoplastic copolymer B may optionally include another monomer capable of copolymerization as the third repeating unit. Preferable examples of the third repeating unit include an acryl type monomer such as butyl acrylate and an olefin type monomer such as ethylene and propylene. One or more of these third repeating units may be copolymerized, thereby improving the flexibility of a film. N-substituted maleimide can be also used as the third repeating unit. When N-substituted maleimide, particularly phenylmaleimide, is used as a copolymerizing component, the heat resistance of the resin can be improved.

When the third repeating unit is used, the content of the third repeating unit is preferably 30% by weight or less with reference to the weight of the thermoplastic copolymer B, more preferably 20% by weight or less, even more preferably 15% by weight, and especially preferably 10% by weight or less. When the content of the third repeating unit is excessively large, the performance by the repeating units represented by formulas (1) and (2) is likely to be insufficient.

Further, when the third repeating unit is used, the content of the third repeating unit is preferably 1% by weight or more with reference to the weight of the thermoplastic resin B, more preferably 2% by weight or more, even more preferably 3% by weight or more, and especially preferably 5% by weight or more. When the content of the third repeating unit is excessively small, the performance by the third repeating unit is likely to be insufficient with respect to the whole composition.

Note that when the third repeating unit is used, the ratio of the repeating unit of formulas (6) to (7) is preferably the same as that when the third repeating unit does not exist.

(Polymerization Method of Thermoplastic Resin B)

The thermoplastic resin B can be obtained by copolymerizing the above-described monomers directly. One of a polymer of a styrene type compound and a polymer of an unsaturated nitrile compound may be graft-copolymerized with the other. Alternatively, a styrene type compound and an unsaturated nitrile type compound are graft-polymerized with an acryl type polymer having rubber elasticity, thereby making it possible to obtain a more preferable resin.

A very preferable thermoplastic resin is a copolymer including acrylonitrile as the unsaturated nitrile compound and styrene as the styrene type compound. The copolymer is known as AS resin, AAS resin or the like.

The thermoplastic resin B preferably has a weight-average molecular weight of $1 \times 10^3$ or more, and more preferably $1 \times 10^4$ or more.

The thermoplastic resin B preferably has a weight-average molecular weight of $5 \times 10^6$ or less, and more preferably $5 \times 10^5$ or less.

The content of the unsaturated nitrile type repeating unit in the thermoplastic resin is preferably 20 to 60% by weight, and more preferably 20 to 50% by weight. The content of the styrene type repeating unit is preferably 40 to 80% by weight, and even more preferably 50 to 80% by weight. Particularly, when the unsaturated nitrite type repeating unit is 20 to 30% by weight and the styrene type repeating unit is 70 to 80% by weight, a very preferable result is obtained. When the content of the styrene type repeating unit or nitrile type repeating unit is excessively large, a retardation due to molecule alignment in a film is likely to be large and the wavelength dependence is likely to be high. Moreover, the compatibility of the thermoplastic resin B with the thermoplastic resin A is likely to be reduced, and the haze of an obtained film is likely to be large. Therefore, when the content of the styrene type repeating unit or nitrile type repeating unit is excessively large, a practical transparent film is unlikely to be obtained.

(Preparation of Composition)

As a method for obtaining a resin composition used in the present invention, an arbitrary known method may be adopted so long as the thermoplastic resin A and the thermoplastic resin B are mixed to be in a form capable of being loaded into a film forming machine.

Examples of such a method include: a method for obtaining a resin composition by simply mixing the thermoplastic resin A and the thermoplastic resin B; and a method for obtaining a resin composition by thermal-melt kneading the thermoplastic resins A and B.

(Ratio of Thermoplastic Resins A to B)

The ratio of the thermoplastic resin A to the thermoplastic resin B used in the film of the present invention is determined depending a retardation required for an intended film. This is because a tendency to exhibit a retardation significantly varies depending on the ratio of the thermoplastic resin A to the thermoplastic resin B, and the retardation of an eventually obtained film varies significantly.

(Production of Film Without Retardation)

A method for producing a film having no retardation will be described below.

When the mixture ratio of the thermoplastic resin A to the thermoplastic resin B is appropriately determined, a film can be obtained in which a retardation is not substantially exhibited even if molecules in a film are aligned due to stress applied on the film. In other words, a film can be obtained in which a retardation is not substantially exhibited even if the film is stretched. That is, a stretched film which does not substantially have a retardation is obtained. The preferable mixture ratio which leads to achievement of such a preferable property depends on the types of the thermoplastic resin A and the thermoplastic resin B. In general, the ratio (I/P ratio) of the number P of moles of a phenyl group included in the thermoplastic resins B and A to be used to the number I of moles of an imide group included in the thermoplastic resin A and B is preferably 1.3 or more, more preferably 1.4 or more, and even more preferably 1.5 or more. Further, such a ratio is preferably 2.9 or less, more preferably 2.6 or less, and even more preferably 2.4 or less. In one embodiment, the I/P ratio is preferably 1.7 to 2.9, more preferably 1.8 to 2.6.

In another embodiment, the I/P ratio is preferably 1.3 to 2.0, and more preferably 1.5 to 1.9.

As to the mixture ratio of the thermoplastic resin A and the thermoplastic resin B, in general, the content of the thermoplastic resin A is preferably 50 to 95% by weight of the overall resins included in a film, more preferably 60 to 95% by weight, and even more preferably 65 to 90% by weight, and the content of the thermoplastic resin B is preferably 5 to 50% by weight of the overall resins included in a film, more preferably 5 to 40% by weight, and even more preferably 10 to 35% by weight. The thermoplastic resin A ranging from 65 to 80% by weight is more preferably mixed with the thermoplastic resin B ranging from 20 to 35% by weight. Especially preferably, the thermoplastic resin A ranging from 65 to 75% by weight is preferably mixed with the thermoplastic resin B ranging from 25 to 35% by weight.

When the content of the thermoplastic resin A or B is excessively large, a retardation in a stretched film is likely to be large in a plane or thickness direction.

When the thermoplastic resin A is a copolymer mainly including isobutylene and N-methylmaleimide and the thermoplastic resin B is a copolymer mainly including acrylonitrile and styrene, the content of acrylonitrile is preferably 20 to 50% by weight, more preferably 25 to 40% by weight, and even more preferably 26 to 29% by weight. Further, the content of styrene is preferably 50 to 80% by weight, more preferably 60 to 75% by weight, and even more preferably 71 to 74% by weight.

In particular, when the content of acrylonitrile is 26 to 29% by weight and the content of styrene is 71 to 74% by weight, the thermoplastic resin B ranging from 0 to 80% by weight has satisfactory compatibility with the thermoplastic resin A. In such a mixture, the thermoplastic resin A and the thermoplastic resin B have satisfactory and extensive compatibility with each other. Further, it is possible to obtain a stretched film having an extremely small retardation both in a plane direction and a thickness direction of a film. The weight ratio of the thermoplastic resin A to the thermoplastic resin B is preferably 50:50 to 80:20, more preferably 60:40 to 80:20, and even more preferably 60:40 to 75:25.

When such preferable compositions are appropriately selected, stretched films which do not substantially exhibit birefringence can be obtained. Further, films having a high level of total light transmission and low haze can be obtained. This is because if the composition ratio of the thermoplastic resin A to the thermoplastic resin B is suitably adjusted, a retardation due to molecule alignment in an obtained film can become small.

In other words, the above-described composition can lead to a reduction in retardation in a plane direction of a film. Specifically, for example, the retardation in a plane direction of a film is preferably 10 nm or less, and more preferably 5 nm or less. Moreover, the retardation in a thickness direction of a film can be suppressed in the range of 50 nm or less, and more preferably 20 nm or less. Moreover, the alignment retardation can be preferably suppressed in the range of 100 nm or less, and more preferably 50 nm or less. Thus, a transparent film which does not substantially exhibit birefringence and whose light transmittance is 85% or more, more preferably 88% or more, and even more preferably 90% or more and whose haze is 2% or less, and preferably 1% or less, can be obtained. In a very preferable embodiment, the haze can be suppressed in the range of 0.5% or less.

Note that when the retardation in a plane direction of a film is 10 nm or less and the retardation in a thickness direction of the film is 50 nm or less, the film can be generally recognized as having substantially no birefringence.

If a film has a light transmittance of 85% or more and a haze of 2% or less, the film can be used as a high performance film in various optical applications.

(Other Mixture Materials)

A film according to the present invention may optionally include a known additive such as a plasticizer, a thermal stabilizer, a lubricant, an ultraviolet absorber or a filler, or a resin other than the above-described thermoplastic resins A and B. Note that such a resin other than the thermoplastic resins A and B is also herein referred to as "third resin".

In a preferable embodiment, the overall thermoplastic resins A and B is 100% by weight. However, the third resin may be optionally used.

A plasticizer for improving the mechanical property of an unstretched film and a polymer having flexibility may be added to a resin composition for preparing a film. However, when such a material is used, the glass transition temperature of the film is reduced so that the heat resistance or transparency of the film is likely to be impaired. Therefore, when such a plasticizer or flexibility polymer is used, the addition amount should be set to such an amount as not to impair the performance of a film. The addition amount is preferably 10% by weight or less of the resin composition, more preferably 5% by weight or less, and even more preferably 3% by weight or less.

When the imide content of the thermoplastic resin A is high, e.g., specifically the content of the maleimide unit of the thermoplastic resin A is 40% by mole or more, an obtained film is likely to be rigid and brittle. In this case, if a small amount of plasticizer is added, it is useful since it is possible to prevent stress whitening or tear of a film. As such a plasticizer, conventional known plasticizers can be used.

(Plasticizer)

Examples of a plasticizer which are preferably used are given below. Examples of a phthalic acid type plasticizer include dimethyl phthalate, diethyl phthalate, di-n-butyl phthalate, di-n-octyl phthalate, di-n-ethylhexyl phthalate, diisooctyl phthalate, di-n-octyl phthalate, di-n-decyl phthalate, diisodecyl phthalate, di-n-dodecyl phthalate, diisotridecyl phthalate, dicyclohexyl phthalate, butylbenzyl, phthalate, di-2-ethylhexyl phthalate, and di-2-ethylhexyl isophthalate. Examples of an aliphatic dibasic acid type plasticizer include di-n-decyl adipate, diisodecyl adipate, di-2-ethylhexyl adipate, di-2-ethylhexyl azelate, dibutyl sebacate, and di-2-ethylhexyl sebacate. Examples of a phosphate ester type plasticizer include tributyl phosphate, tri-2-ethylhexyl phosphate, phosphate-2-ethylhexyl, and tricresyl phosphate. Examples of an epoxy type plasticizer include epoxidated soy oil and epoxidated tall oil fatty acid-2-ethylhexyl. Examples of a fatty acid ester type plasticizer include butyl stearate, butyl oleate, chlorinated paraffin, and chlorinated methyl fatty acid. Examples of a polymer type additive include polyethylene glycol dimethyl ether, polyethylene glycol benzoate ester, and a polymer compound containing an ester group (polycondensate of a dibasic acid such as adipic acid, sebacic acid, or phthalic acid with 1,2-propylene glycol, 1,3-propylene glycol, or the like).

Out of those additives, the following plasticizers are preferable: di-n-decyl adipate, diisodecyl adipate, di-2-ethylhexyl adipate, di-2-ethylhexyl azelate, dibutyl sebacate, di-2-ethylhexyl sebacate, tributyl phosphate, tri-2-ethylhexyl phosphate, phosphate-2-ethylhexyl, tricresyl phosphate, epoxidated soy oil, epoxidated tall oil fatty acid-2-ethylhexyl, butyl stearate, butyl oleate, chlorinated paraffin, chlorinated fatty acid methyl, polyethylene glycol dimethyl ether, those of which does not include an aromatic group; or a polymer compound containing an ester group (polycondensate of dibasic acid such as adipic acid or sebacic acid with 1,2-propylene glycol, 1,3-propylene glycol, or the like). These plasticizers do not absorb light in a short wavelength range of the visible region, so that the plasticizers do not have an adverse influence on the wavelength dependence of a retardation. Therefore, these plasticizers are especially preferable additives. Preferably, 20 parts by weight or less of each plasticizer is added to 100 parts by weight of the above-described film mixture materials by weight, more preferably, 10 parts by weight or less of each plasticizer. When the amount of an additive is excessively large, it is likely that the additive will bleed and stain the surface of a roll film so that a roll film cannot be obtained in a sequential manner.

(Third Resin)

The third resin means a resin other than the above-described thermoplastic resins A and B. The third resin may be a thermoplastic resin or a thermosetting resin. Preferably, the third resin is a thermoplastic resin. The third resin may be a single type of resin or a blend of a plurality types of resins. The content of the third resin used is preferably 30% by weight or less of the total amount of resins used in a resin composition, i.e., the thermoplastic resins A and B and the third resin, more preferably 20% by weight or less, and even more preferably 10% by weight or less. Further, the third resin preferably shares 1% by weight or more of the total amount, more preferably 2% by weight or more, even more preferably 3% by weight or more.

When the content of the third resin is excessively large, the performance of the thermoplastic resins A and B is not likely to be sufficiently exhibited. When the content of a resin having low compatibility with the thermoplastic resins A and B is excessively large, the optical performance of an obtained film is likely to be lowered. When the content of the third resin is excessively small, the addition of the third resin is unlikely to exhibit an effect.

Note that even when the third resin is used, the mixture ratio of the thermoplastic resin A to the thermoplastic resin B is preferably the aforementioned ratio, similar to the case when the third resin is not used.

(Filler)

A filler may be optically contained in the film of the present invention for the purpose of an improvement in slipperiness of the film or for other purposes. As a filler, an arbitrary known filler which is used in conventional films can be used. A filler may be an inorganic fine particle or an organic fine particle. Examples of an inorganic fine particle include: a metal oxide fine particle such as silicone dioxide, titanium dioxide, aluminum oxide and zirconium oxide; a silicate fine particle such as calcined calcium silicate, calcium silicate hydrate, alminum silicate and magnesium silicate; calcium carbonate; talc; clay; calcined kaolin; and calcium phosphate. Examples of an organic particle include a resin particle such as silicone type resin, fluorine type resin, acryl type resin, and cross-linked styrene type resin.

(Ultraviolet Absorber)

An ultraviolet absorber can be optionally contained in the film of the present invention. The ultraviolet absorber contained in the film leads to an improvement in weather resistance of the film. Further, the durability of a liquid crystal display device using the film can be improved. Therefore, the ultraviolet absorber is preferable in practice. An arbitrary ultraviolet absorber conventionally known can be used for the film of the present invention. Examples of the ultraviolet absorber include: a benzotriazole type ultraviolet absorber such as 2-(2H-benzotriazol-2-yl)-p-cresol and 2-benzotriazol-2-yl-4,6-di-t-butylphenol; a triazine type ultraviolet absorber such as 2-(4,6-diphenyl-1,3,5-triazin-2-yl)-5-[(hexyl)oxy]-phenol; and a benzophenone type ultraviolet absorber such as octabenzon.

Further, a photostabilizer other than the ultraviolet absorbers can be optionally added to the film of the present invention. Specifically, for example, a benzoate type photostabilizer such as 2,4-di-t-butylphenyl-3,5-di-t-butyl-4-hydroxybenzoate, or a hindered amine type photostabilizer such as bis(2,2,6,6-tetramethyl-4-piperidyl) sebacate, can be used.

(Production of Film)

An arbitrary method conventionally known can be used to form the above-described resin composition in the form of a film. Examples of the method include a solution flow expanding method, a melt forming method, and the like. Any of these methods can be adopted. Examples of the melt forming method include a melt extrusion method, an inflation film process method, and the like.

In one preferable embodiment, a resin composition to be used is preliminarily dried before forming a film. The preliminary drying prevents defects such as bubbles in a film. Therefore, the preliminary drying is very useful.

A film may be formed using a resin composition obtained simply by mixing the thermoplastic resin A and the thermoplastic resin B. The thermoplastic resin A and the thermoplastic resin B may be first subjected to thermal melt kneading to obtain a material in the form of pellet or the like and, thereafter, the material in the form of pellet or the like may be shaped into the form of a film.

(Melt Forming Method)

The film of the present invention is characterized in that a retardation due to molecule alignment in processing is likely to be suppressed. Therefore, a method for forming the film by a melt forming method is preferable.

When the film is formed by a melt forming method, an arbitrary known method can be adopted. For example, a melt extrusion method such as a T-die method or an inflation film process method may be adopted. Alternatively, a calendar method, a thermal press method, and an injection method can be adopted. A melt forming method using the T-die method is preferable since it is easy to obtain a wide film having a satisfactorily accurate thickness by the method.

(Solution Flow Expanding Method)

A solution flow expanding method is preferable since a film having an extremely accurate and uniform thickness can be obtained by the method. With the solution flow expanding method, a film without defects such as a die line can be obtained. Further, a film having a small variation in film thickness can be easily obtained. For example, it is possible to easily obtain a film having a variation in thickness which is 5% or less. Further, an optically isotropic film having a small retardation can be easily obtained. Note that flow expanding is also herein referred to as "casting".

A solvent which can be used for a solvent flow expanding method may be selected from known solvents. The above-described thermoplastic resin A and the thermoplastic resin B are very soluble in halogenated hydrocarbon type solvents such as methylene chloride and trichloroethane. Further, the solvents have low boiling points. Therefore, such halogenated hydrocarbon solvents are preferable. Further, non-halogen type solvents having high polarity, such as dimethylformamide and dimethylacetamide, can be used. Further, aromatic type solvents such as toluene, xylene and anisole, cyclic ether type solvents such as dioxane, dioxolane, tetrahydrofuran and pyran, and ketone type solvents such as methyl ethyl ketone can be used. These solvents may be used alone or a mixture of a plurality of solvents may be used.

An arbitrary amount of solvent can be used so long as a sufficient thermoplastic resin for casting can be dissolved in the solvent. Note that the term "dissolve" herein means that a resin is present in a solvent in a sufficiently homogeneous state for casting. The solute is not necessarily dissolved in the solvent completely. Similarly, the term "solution" herein means a liquid in which a resin is present in a solvent in a sufficiently homogeneous state for casting.

Further, for example, controlling the evaporation rate of a solvent by addition of a non-solvent such as alcohol is a preferable method for obtaining a film having an excellent surface property. The non-solvent means a liquid which if used alone, cannot dissolve the above-described resin, due to the poor solubility of the resin.

When the film is formed by the solution flow expanding method, the thermoplastic resin A and the thermoplastic resin B are dissolved in the above-described solvent. When the thermoplastic resin A and the thermoplastic resin B to be used for the above-described film of the present invention have the above-described appropriate composition and are dissolved in the above-described solvent, a substantially homogeneous solution is easily obtained. Note that the thermoplastic resin A and the thermoplastic resin B may be formed in the form of pellets, etc. by thermal melt kneading before dissolving the resins in a solvent.

The concentration of a resin in a solution is preferably 1 to 90% by weight, more preferably 5 to 70% by weight, and even more preferably 10 to 50% by weight.

Thereafter, the thus-obtained solution is flow-expanded on a support. As a flow expanding method, an arbitrary method conventionally known can be used. Preferable examples of a support used in flow expanding may include a stainless endless belt, and a film such as polyimide film or polyethylene terephthalate film. These films may be stretched. The film may be a uniaxial or biaxially stretched film. The biaxially stretched film is preferable.

Thereafter, the resultant intermediate product is dried to obtain a film. In one embodiment, the intermediate product obtained by flow expanding may be dried on the support until the amount of remaining solvent becomes 1% or less. In another embodiment, the intermediate product can be peeled off the support at a point of time when the intermediate product is dried to obtain self-supporting capability. The film can be dried to obtain the self-supporting capability and then has been peeled off the support, and thereafter the resultant film can be optionally further dried.

An arbitrary drying method conventionally known can be used as the drying method. Specifically, for example, a float method, or a tenter or roll conveying method can be used.

(Retardation in Film Without a Retardation)

In one embodiment of a film having substantially no retardation, the retardation value of the film of the present invention is 20 nm or less, more preferably 10 nm or less, and even more preferably 5 nm or less.

Herein, for the sake of convenience, the film is described as "not having a retardation" or having substantially no retardation when the retardation of the film is less than 20 nm. The film having a retardation of 0.20 nm or less is useful in various optical applications as a film having substantially no retardation.

(Retardation in Thickness Direction)

It is important to control a retardation in a thickness direction as well as an in-plane retardation of the film, especially, in order to reduce the viewing angle dependence of a film retardation. The retardation in a thickness direction of the film is represented by:

$$|(nx+ny)/2-nz)|\times d$$

where nx represents the maximum refractive index in a plane of the film, ny represents the refractive index in a direction perpendicular to nx, nz represents the refractive index in a thickness direction of the film, and d represents the thickness of the film.

The film of the present invention tends not to exhibit a retardation, so that the film can also have a small retardation in a thickness direction. In the film of the present invention having substantially no retardation, a preferable retardation in a thickness direction is 200 nm or less, more preferably 100 nm or less, even more preferably 50 nm or less, and especially preferably 20 nm or less.

(Alignment Retardation)

The tendency to exhibit a retardation due to molecule alignment can be evaluated using a retardation exhibited by stretching the film under given conditions (alignment retardation). Herein, such a retardation exhibited by stretching the film under given conditions is called alignment retardation. The alignment retardation is, for example, determined as follows.

A film having a width of 5 cm and a length of 25 cm is held at both of the narrow sides, and left for one minute at glass transition temperature. The film is uniaxially stretched in the length direction at a speed of 0.2 m/min to obtain a stretched film having a stretch ratio of 1.5. The resultant stretched film is cooled. A retardation is measured at the middle portion of the stretched film. Further, the thickness of the stretched film is measured. Based on the measured retardation and thickness of the middle portion of the stretched film, a retardation in the case when the thickness of the film is 100 $\mu$m is calculated. The calculated retardation is regarded as an alignment retardation.

Bisphenol A-type polycarbonate which is typically used as an optical film exhibits a large alignment retardation of 1000 nm or more. However, a film of the mixture of the thermoplastic resin A and the thermoplastic resin B which has a preferable composition ratio can preferably have an alignment retardation of 300 nm or less, more preferably 200 nm or less, and even more preferably 100 nm or less. Further, the alignment retardation can be controlled by changing the composition within such ranges. Surprisingly, a film which has an alignment retardation of 50 nm or less and is unlikely to exhibit a retardation can be obtained by optimizing the composition.

Thus, when the composition of the thermoplastic resin A and the thermoplastic resin B is specified as described above, an optically, extremely transparent film having a high level of light transmittance and a small level of haze can be obtained. The obtained film is characterized in that a retardation due to molecule alignment caused by stress applied to the film, etc. is unlikely to be exhibited. Further, when the film of the present invention having a relatively large alignment retardation is stretched to add a retardation purposely, the measurement wavelength dependence of the film retardation is small compared with other conventional films (e.g., a film of polycarbonate). This is a feature of the film of the present invention. In addition, the film of the present invention is characterized in that the alignment retardation can be controlled by changing the composition of the thermoplastic resins A and B, whereby the film is very useful for a liquid crystal display device.

(Folding Endurance)

According to the present invention, a film having satisfactory folding endurance is obtained. The folding endurance can be measured in accordance with JIS C5016. For example, the MIT type folding endurance tester D-type (manufactured by Toyo Seiki Seisaku-sho, Ltd.) or the like can be used as a measurement device. The folding endurance of the film is preferably 30 times or more, more preferably 50 times or more, even more preferably 100 times or more, and still more preferably 150 times or more.

Herein, if the above-described folding endurance is obtained with respect to at least one direction in a plane of a film, the film is said to have that folding endurance. Preferably, the above-described satisfactory folding endurance (i.e., 30 times or more, 50 times or more, 100 times or more, or 150 times or more) is obtained in two directions perpendicular to each other in a plane of a film.

Note that herein, the folding endurance is one obtained when a film is 50 μ thick, unless otherwise specified. Alternatively, when the thickness of a film is not equal to 50 μ, the folding endurance of the film is converted into one corresponding to a film having a thickness of 50 μ. In other words, when the thickness of a film is not equal to 50 μ, another modified film having the same composition and stretching state and having a thickness of 50 μ is measured with respect to the folding endurance and the obtained value is used as the folding endurance of the film herein defined. For example, when the thickness of a film is 30 μ, another film having the same material composition, stretching state and the like except that the thickness is changed to 50 μ is produced, the film having a thickness of 50 μ is evaluated, and the result is regarded as the folding endurance of the film of a thickness of 30 μ.

(Tear Propagation Strength)

According to the present-invention, a film having satisfactory tear propagation strength is obtained. The tear propagation strength can be measured in accordance with JIS K7128 (trouser method). As a measurement device, an autograph (manufactured by Shimadzu corporation) can be used. The tear propagation strength of a film is preferably 150 gf/mm or more, more preferably 180 gf/mm or more, even more preferably 200 gf/mm or more.

Herein, if the above-described tear propagation strength is obtained with respect to at least one direction in a plane of a film, the film is said to have that tear propagation strength. Preferably, the above-described satisfactory tear propagation strength (i.e., 150 gf/mm or more, 180 gf/mm or more, or 200 gf/mm or more) is obtained in two directions perpendicular to each other in a plane of a film.

(Stretching)

An unstretched film obtained from the thermoplastic resin A and the thermoplastic resin B typically has low mechanical strength. In particular, the folding endurance (indicating durability against repetition of bending) of such a film is typically 10 times or less. Further, the tear propagation strength of the film is typically about 100 to 120 gf/mm. Therefore, an unstretched, wide film is somehow disadvantageous in terms of industrial handling. As described above, the inventors have found that when the film is stretched, the mechanical strength of the film is much improved. In the above-described composition, after the film has been stretched to improve the tear propagation strength and the folding endurance, the retardation in the film is not increased. Therefore, stretching the film having the thermoplastic resin A and the thermoplastic resin B is very preferable for the present invention.

Stretching a film leads to an improvement in folding endurance against bending in a stretching direction. Further, stretching a film leads to an improvement in tear propagation strength in a direction perpendicular to the stretching direction. Therefore, when a film in the form of a roll needs to have improved tear propagation strength in a width direction of the film, lengthwise stretching is generally preferable. In order to improve tear propagation strength in a machine direction (lengthwise) of a film, widthwise stretching is preferable. In order to achieve improvements in both the directions, biaxial stretching is preferable. The biaxial stretching may be sequential biaxial stretching or simultaneous biaxial stretching. The simultaneous stretching is especially preferred, since the simultaneous stretching can improve the mechanical properties uniformally over the plane of a film. In the biaxial stretching, when stretching in both directions is adjusted so that retardations due to the stretching are canceled with each other, an in-plane retardation can be suppressed to a further lower level.

As the stretching method, an arbitrary stretching method conventionally known can be adopted. A thermal stretching method is preferable. A uniaxial or biaxial stretching may be used. The film of the thermoplastic resins A and B is unlikely to exhibit a retardation in stretching as compared with conventional polycarbonates. Therefore, in general, a larger stretch ratio of the film is used compared with when a conventional polycarbonate is stretched. Therefore, lengthwise uniaxial stretching which can easily achieve a large stretch ratio is preferable. Further, when the optical uniaxialty of an obtained retardation film is important, a free end lengthwise uniaxial stretching is a very preferable method.

Further, it is possible to control the refractive index of a film in three dimensions by using a special biaxial stretching disclosed in Japanese Laid-Open Publication No. 5-157911. In providing a retardation to the film of thermoplastic resins A and B, the film has an advantage of reducing a variation in retardation in a plane of the obtained film since a retardation due to alignment is not likely to be exhibited in the film.

The optimum values of stretching temperature and stretch ratio can be adopted using the tear propagation strength of an obtained film as a guideline. In general, the stretch ratio is preferably 1.1 to 3 fold, more preferably 1.3 to 2.5 fold, and even more preferably 1.5 to 2.3 fold.

If the thermoplastic resin A and the thermoplastic resin B fall within the above-described preferable composition range, selection of appropriate stretching conditions can lead to achievement of stretching a film without substantially reducing the light transmission and haze. In particular, when a film is stretched by a factor of 1.3 or more, or preferably a factor of 1.5 or more, the tear propagation strength and folding endurance of a film, etc. are significantly improved, thereby making it possible to obtain a film having a high level of light transmission (e.g., 85% or more) and a small level of haze (e.g., 1% or less).

A temperature for stretching is preferably selected from a range of (Tg−30)° C. to (Tg+30)° C. where Tg is the glass transition temperature of a film obtained in accordance with the DSC method. Particularly preferred stretching temperature is within the range of (Tg−20)° C. to (Tg+20)° C. When the film is stretched at an appropriate temperature range, the whitening of the film in stretching can be reduced or prevented. Further, it is possible to reduce a variation in retardation in the obtained retardation film. When the stretching temperature is excessively high, the tear propagation and folding endurance of an obtained film is likely to be insufficient. Further, the stretch ratio is likely to be excessively large, thereby making it difficult to achieve industrial implementation of such a film. Conversely, when a film is stretched at an excessively low temperature, the haze of the stretched film is likely to be large. In the extreme, the film is likely to be torn or the like, thereby hindering the production process.

As the stretching method, known stretching methods can be used including widthwise stretching using a tenter, lengthwise stretching using a roll, and free end uniaxial stretching, and a sequential combination thereof such as sequential biaxial stretching and simultaneous biaxial stretching in which stretching is simultaneously performed lengthwise and widthwise, etc.

A film, which is obtained by the above-described method and does not substantially have a retardation, has a retardation of less than 20 nm in a plane direction of the film. When the film which does not substantially have a retardation is used in a film substrate for a plastic liquid crystal display device or the like, if the retardation in a plane direction of the film exceeds 20 nm, light leakage occurs due to such a retardation in the liquid crystal display device, which is likely to cause contrast deficiency. The retardation in a plane direction of the film is more preferably 10 nm or less, and even more preferably 5 nm or less. Further, the film of the present invention preferably has a retardation of 200 nm or less in a thickness direction, more preferably 100 nm or less, even more preferably 50 nm or less, and still more preferably 25 nm or less.

(Production of Retardation Film)

In another embodiment, the present invention relates to a retardation film. Herein, for the sake of convenience, a film having a retardation of 20 nm or more is referred to as "retardation film", distinguishing from a film having a retardation of less than 20 nm. Specifically, for example, when the term "the retardation film of the present invention" is used, it means the film of the present invention having a retardation of 20 nm or more.

Next, a production method of a retardation film will be described.

When the film of the present invention is a retardation film, material similar to the above-described material for a film not having a retardation can be basically used. Out of the above-described materials, the mixture ratio of the thermoplastic resins A and B can be appropriately adjusted to control the measurement wavelength dependence of a retardation.

In general, the content of the thermoplastic resin A is preferably 5 to 95% by weight of the overall resins in a film, more preferably 5 to 65% by weight or 75 to 95% by weight, and even more preferably 5 to 60% by weight or 80 to 95% by weight.

The content of the thermoplastic resin B is preferably 5 to 95% by weight of the overall resins in a film, more preferably 5 to 25% by weight or 35 to 95% by weight, and even more preferably 5 to 20% by weight or 40 to 95% by weight.

Further, when the above-described stretching conditions are appropriately regulated, a film having a desired retardation can be easily obtained. This is because the tendency to exhibit a retardation can be controlled by adjusting the mixture ratio of the thermoplastic resin A and the thermoplastic resin B.

Based on the description of the present specification, those skilled in the art who desire a film having a specific retardation can readily adjust the mixture ratio of the thermoplastic resin A and the thermoplastic resin B and further regulate the stretching conditions to easily produce the film having the desired retardation. In other words, the tendency to exhibit a retardation can be easily adjusted by appropriately adjusting mixture ratio of the thermoplastic resin A and the thermoplastic resin B suitable for the above-described film not having a retardation. Further, appropriate stretching can lead to achievement of a desired retardation film.

When a retardation film is produced, for example, a uniform retardation can be provided for an unstretched film obtained by the above-described method, by subjecting the film to at least uniaxial stretching performed by a known stretching method to align resins in the film. The retardation film obtained by stretching a film obtained by the above-described method has an advantage of having a small level of the measurement wavelength dependence of a retardation compared with retardation films of conventional polycarbonates. Further, for the retardation film obtained by stretching the film obtained by the above-described method, the mixture ratio of the thermoplastic resins A and B can be appropriately adjusted to control the measurement wavelength dependence of a retardation.

As the stretching method, a stretching method similar to that described above for the film not having a retardation can be used.

When a retardation film of the thermoplastic resins A and B is produced, the retardation value of the retardation film can be selected from the range of more than 20 nm to 1000 nm, depending on purpose. The retardation value can be set to a desired value by controlling the production conditions of a film such as film thickness, stretching temperature and a stretch ratio.

For materials and production methods other than those described above, the materials and production methods for a film not having a retardation can be used in production of a retardation film.

(Applications of Retardation Film)

When the retardation film of the present invention is used for color compensation in an STN liquid crystal display device, the retardation value is typically selected from the range of 300 nm to 2000 nm. Further, when the retardation film of the present invention is used as a half-wave plate, the retardation value is typically selected from the range of 200 nm to 400 nm. When the retardation film of the present invention is used as a quarter-wave plate, the retardation value is typically selected from the range of 90 nm to 200 nm. For the quarter-wave plate, more preferably, the retardation value is selected from the range of 100 nm to 180 nm.

The retardation film of the present invention can obtain a small level of measurement wavelength dependence of a retardation compared with retardation films of known polycarbonates. Therefore, the retardation film of the present invention can be suitably used in a reflection TFT liquid crystal display device and the like. Further, the retardation film of the present invention is characterized in that the retardation value is unlikely to be changed by stress. Therefore, when the retardation film is attached to a polarization plate, the retardation is unlikely to be changed regardless of the stress caused by deformation of the polarization plate. In particular, the retardation film of the present invention is suitable for a liquid crystal display having a large-sized screen.

Common features among films not having a retardation and retardation films will be described below.

(Film Thickness)

The thickness of the film of the present invention is preferably 20 to 300 $\mu$m, more preferably 30 to 200 $\mu$m, even more preferably 50 to 100 $\mu$m.

(Light Transmission and Haze)

The light transmission of the film is preferably 85% or more, more preferably 88% or more, and even more preferably 90% or more. The haze of the film is preferably 2% or less, and more preferably 1% or less.

(Surface Treatment Method)

A film having the above-described thermoplastic resins A and B typically has a surface energy of 50 dyne/cm or less. The surface energy of the film can be measured by a conventional method. A specific method is described in D. K. Owens, Journal of Applied Polymer Science, vol 13, p.

1741 (1969) and the like. When another film or glass is laminated to such a surface having low surface energy via an adhesive or glue, it is difficult to obtain sufficient adhesive strength or glue strength and both are likely to be peeled apart from each other. Even when initial adhesive strength is sufficient, the adhesive strength or glue strength is likely to be reduced in a long-term use, so that both become likely to be peeled apart from each other. The speed of reduction of the adhesive strength varies depending on environmental conditions, but the adhesive strength is reduced in any environmental condition.

Therefore, an obtained film is optionally subjected to surface treatment. The surface treatment can be executed at any time after the film has been formed. In the case of an unstretched film, the surface treatment is executed after the film has been formed. In the case of a uniaxially stretched film, the surface treatment maybe executed before or after stretching. In the case of a simultaneously, biaxially stretched film, the surface treatment may be executed before or after stretching. In the case of a sequentially, biaxially stretched film, the surface treatment may be executed before first stretching, or after the first stretching and before second stretching, or after the second stretching. In the case of a stretched film, in general, the surface treatment is preferably executed after stretching.

As the surface treatment method, an arbitrary method conventionally known can be used. Examples of such a method include: an electrical treatment such as corona discharge treatment or spark treatment; plasma treatment under low or atmospheric pressure; ultraviolet irradiation treatment under the presence or absence of ozone; acid treatment using chromic acid, etc; flame treatment; and primer treatment such as silane type primer treatment or titanium type primer treatment, etc. With such surface activation treatment, a film which consistently exceeds 50 dyne/cm can easily obtained.

The level of the corona discharge treatment can be controlled by the discharge content represented by the following formula (II):

$$H=P/(LS \times M) \quad \text{(II)}$$

wherein H represents a discharge content, P represents high frequency power (W), LS represents the transport rate (m/min) of a film, and M represents discharge width (m). The condition of the corona discharge treatment is preferably 10 to 500 W·min/m². Taking productivity into account, the upper limit of the discharge amount is preferably 300 W·min/m², and more preferably 100 W·min/m².

In the plasma treatment, ambient gas is preferably a single gas such as hydrogen, carbonic acid gas, nitrogen, argon, helium or oxygen, or mixed gas thereof. The atmospheric pressure plasma treatment is preferable. In general, the atmospheric gas is preferably obtained by mixing 1 to 20% by volume of one or more types of active gas such as oxygen, air, or carbonic acid gas, with nitrogen or inert gas such as helium or argon.

Further, surprisingly, the film of the present invention is characterized in that the surface energy can be increased by exposing the film to an alkaline solution. Preferably, sodium hydroxide, potassium hydroxide, tetramethylammonium hydroxide, or the like is used as an alkaline component of the alkaline solution. Water or alcohol such as methyl alcohol, ethyl alcohol or isopropyl alcohol is used as a solvent for the alkaline solution. The alkaline component is dissolved in a single or mixed solvent to prepare the alkaline solution. The surface energy of a film can be increased by contacting and reacting the surface of a film with the alkaline solution.

The thus obtained film which has high surface energy has an affinity for an adhesive or glue. Therefore, when the film is laminated with another film or glass, etc., the peel strength is great. In particular, the film has an advantage of having great peel strength even under high temperature and high humidity. The preferable value of the surface energy varies depending on the types of adhesives or glues used, but preferably 50 dyne/cm or more, more preferably 55 dyne/cm or more. When the surface energy is excessively low, satisfactory adhesiveness is not likely to be obtained. Although there is no specific upper limit of the surface energy, the surface energy is preferably 80 dyne/cm or less, and more preferably 70 dyne/cm or less in terms of equipment for the surface treatment and costs. The value of the surface energy can be adjusted by appropriately selecting a treatment method or treatment conditions.

Typically, the thus improved surface energy is gradually decreased by storage the film at room temperature and the effect of the surface treatment is reduced. In particular, in the case of cycloolefin type resins, as shown in Comparative Example 10, the surface energy (54 dyne/cm) after the plasma treatment followed by storage for 3 days is significantly reduced to 45 dyne/cm after 20 days. This means that it is difficult to maintain an optimum surface energy state in a stable manner. In other words, there is a problem that an obtained laminated film has a variation in peel strength. The film of the thermoplastic resin A and the thermoplastic resin B is characterized in that the film is unlikely to decrease the effect of the surface treatment over time, and tends to maintain the optimum surface energy in a stable manner.

(Coating Layer)

Further, on a surface of the transparent film of the present invention, a coating layer such as a hard coat layer can be optionally provided. Further, in the film of the present invention, a transparent conductor layer of indium-tin oxide or the like can be provided by sputtering or the like via or not via the coating layer and the resultant film can be used as an electrode substrate of a plastic liquid crystal display device or an electrode substrate of a touch panel. Preferably, such a coating layer is formed with a thickness of 0.1 to 10 μm, and more preferably 1 to 5 μm.

Preferable examples of the coating layer include: an organic type coating layer of melamine resin type, acryl resin type, urethane resin type, alkyd resin type, or fluorine-containing resin type; an organic-silicone composite, for example, obtained by mixing a partial hydrolysate of alkyltrialkoxysilane or tetraalkoxysilane with polyesterpolyol or etherifiedmethylol melamine. The coating layer may also be made of a silicone type material such as a partial hydrolysate of aminosilane or epoxysilane, a silane coupling agent and a partial hydrolysate of alkyltrialkoxysilane or tetraalkoxysilane, and colloidal silica and a hydrolysate of alkyltrialkoxysilane.

One or both sides of the transparent film of the present invention can be coated with these coating materials followed by heat setting to obtain a film having a solvent resistance membrane. In this case, if a low temperature-curing catalyst is simultaneously used, reaction can progress at low temperature, thereby advantageously suppressing heat denaturation of a film. Further, a cured layer can be preferably used, which is obtained by adding a photosensitizer to a monomer or oligomer of polyfunctional acrylate or the like and curing the monomer or oligomer using ultraviolet or an electron beam.

Various fillers may be optionally added to these coating layers. Examples of a preferable filler include an organic type filler such as polymethacrylate type, polyacrylate type, polyolefin type, polystyrene type, divinylbenzene type, benzoguanamine type, and organic silicone, or an inorganic type filler such as silica, alumina, and titanium oxide.

When a filler is added to a film used in a display portion of a liquid crystal display device or the like, glitter is sometimes recognized in a displayed image. In this case, preferably, the shape of filler particles may be modified, a filler is coated with a coating agent, conditions of coating are modified, or the like to improve the performance of coating. A film for a display portion is desired to have a transmitted image visibility of 80% or more which is measured using an optical comb (0.125 mm) in accordance with the description of JIS K 7105 (6. 6).

(Application)

The film of the present invention may be a final product for use in various applications. Alternatively, the film may be subjected to various additional processes and then may be used for various applications. Specifically, for example, the film is suitably used as an optically isotropic film, a retardation film, or a polarization protection film in optical applications such as a peripheral of a liquid crystal display device.

The above-described film which does not substantially have a retardation is suitably used as an optically isotropic film, a polarizer protection film, or the like.

The above-described film which has a retardation of 20 to 1000 nm is suitably used as a retardation film.

A preferable application for the transparent film of the present invention is as an optically isotropic film. Another preferable application is as a retardation film. Further, the optical isotropic film is used in various applications. One of the preferable applications is as an electrode substrate used in a plastic liquid crystal display device or resistance film touch panel. Another preferable application is as a polarizer protection film.

When the transparent film of the present invention is used as a polarizer protection film, for example, a polarizer can be obtained by adding iodine or dye to a stretched film of polyvinyl alcohol. The polarizer can be laminated to the film of the present invention using a suitable adhesive, thereby obtaining a polarization plate.

A polarizer protection film is provided on one or both sides of a polarizer. Typically, a polarizer protection film is provided on both sides of a polarizer.

In one embodiment, a retardation film is further provided on a polarization plate including a polarizer protection film. For example, if a polarizer protection film is provided on both sides of a polarizer and a retardation film is provided on the resultant structure, then a multi-layer (four-layer) structure is obtained sequentially including:

(1) the polarizer protection film;
(2) the polarizer;
(3) the polarizer protection film; and
(4) the retardation film.

Examples of such a four-layer structure include a circular polarization plate and an elliptic polarization plate.

Depending on the type of the adhesive, the surface-treated film of the present invention can preferably have an adhesive strength with polyvinyl alcohol of 50 Kg/cm$^2$ or more, more preferably 100 Kg/cm$^2$ or more, and especially preferably 200 Kg/cm$^2$ or more. In particular, since the film of the present invention has an appropriate vapor permeability, a water-based polyvinyl alcohol type adhesive can be suitably applied to the film.

Further, another preferable application is as a support substrate for a recording medium or a thin cover layer for a recording layer. The details of such applications are described in Nikkei Microdevice (issued by Nihon Keizai Shinbun, Inc.), p. 155, Jul. 17, 2000.

EXAMPLES

Examples and Comparative Examples will be described below. Initially, methods for measuring each physical property value shown in Examples and Comparative Examples will be described.

<Glass Transition Temperature>

Glass transition temperature was measured in accordance with JIS K7121 using a differential scanning calorimeter (DSC) manufactured by. Seiko Instruments & Electronics Ltd. Specifically, 10 mg of a sample was placed in the DSC device and the sample was heated at a rate of 10° C./min from room temperature, thereby measuring the glass transition temperature of the sample.

<Light Transmission>

Light transmission was measured using light of 550 nm in accordance with a method described in JIS K7105-1981 (5. 5).

<Haze>

Haze was measured in accordance with a method described in JIS K7105-1981 (6. 4).

<Retardation>

A retardation was measured using light having a wavelength of 514.5 nm, using a polarization microspectrophotometer (TFM-120AFT manufactured by ORC Manufacturing Co., Ltd.).

<Retardation in Thickness Direction>

The angle dependence of a retardation was measured using light having a wavelength of 514.5 nm, using a polarization microspectrophotometer (TFM-120AFT manufactured by ORC Manufacturing Co., Ltd,), thereby obtaining nx, ny, and nz. Further, the thickness d of a film was measured. Based on the obtained measured values, a retardation in a thickness direction was calculated using the following formula:

$$\text{Retardation in thickness direction} = |(nx+ny)/2 - nz| \times d.$$

<Alignment Retardation>

A film having a width of 5 cm and a length of 25 cm was held at both the narrow sides of the film, and left for one minute at glass transition temperature. The film was uniaxially stretched in the length direction at a speed of 0.2 m/min to obtain a stretched film having a stretch ratio of 1.5. The resultant stretched film was cooled. A retardation was measured at the middle portion of the stretched film. Further, the thickness of the stretched film was measured. Based on the retardation and thickness of the middle portion of the stretched film, a retardation in the case when the thickness of the film is 100 μm was calculated. The calculated retardation was regarded as an alignment retardation.

<Measurement Wavelength Dependence of Retardation>

The test piece which was used for the measurement of the alignment retardation was used in the following procedure for determining the measurement wavelength dependence of a retardation:

(1) retardation values with respect to measurement wavelengths of 441.6 nm, 514.5 nm, 632.8 nm and 780 nm were measured in accordance with a rotation analyzer method using a polarization microspectrophotometer (TFM-120AFT manufactured by ORC Manufacturing Co., Ltd.);

(2) based on the measured values, each constant in the following empirical formula was determined by the least-squares method:

$$Re = a + b/(\lambda^2 - c)$$

where λ represents measurement wavelength, Re represents a retardation when the measurement was performed using light having a wavelength of λ, and a, b and c are constants;

(3) using the resultant empirical formula, a retardation value at 400 nm (Re(400)) and a retardation value at 550 nm (Re(550)) were calculated; and (4) based on the calculated retardation values, R=Re(400)/Re(550) was calculated, and this value was regarded as an indicator of the measurement wavelength dependence.

<Photoelastic Coefficient>

The birefringence of a film was measured using a polarization microspectrophotometer (TFM-120AFT-PC manufactured by ORC Manufacturing Co., Ltd.). The film was cut in an optical axis direction into strips each having a width of 1 cm. Each strip film was fixed at one end thereof, and a load of 50 g, 100 g or 150 g was applied to the other end thereof, thereby measuring the birefringence of the strip film. Based on the results, a variation in birefringence due to unit stress was calculated.

<Tear Propagation Strength>

Tear propagation strength was measured in accordance with JIS K7128 (trouser method) using an autograph (manufactured by Shimadzu corporation). The pulling rate in the measurement was 200 mm/min. In the measurement, a film having an average thickness of 50±5 μm was used.

<Folding Endurance>

Folding endurance was measured in accordance with JIS C5016 using the MIT type folding endurance tester D-type (manufactured by Toyo Seiki Seisaku-sho, Ltd.). Note that in the measurement, a sample having a width of 15 mm, a length of 200 mm, and an average thickness of 50±5 μm was used.

The present invention will be described in more detail by way of illustrative examples below.

Example 1a 100 parts by weight (90% by weight) of an alternating copolymer consisting of isobutene and N-methyl maleimide (containing 50% by mole of N-methyl maleimide, the glass transition temperature was 157° C.) and 11 parts (10% by weight) of a thermoplastic copolymer consisting of styrene and acrylonitrile (containing 76% by weight of styrene and 24% by weight of acrylonitrile) were dissolved in methylene chloride, thereby obtaining a solution having a solid concentration of 15% by weight. The solution was flow-expanded on a biaxially stretched polyethylene terephthalate film laid on a glass plate. The resultant sample was left for 60 minutes at room temperature. Thereafter, the sample was peeled off the polyethylene terephthalate film, and the four sides of the sample were fixed and the film was dried for 10 minutes at 100° C. followed by drying for 10 minutes at 140° C. An unstretched film having a thickness of about 100 μm was obtained. This unstretched film had a retardation value of 8 nm, a light transmission of 92%, and a haze of 0.3%.

Example 1b

A sample film of 30 cm×10 cm was cut off the unstretched film obtained in Example 1a. The sample film was subjected to free end lengthwise uniaxial stretching in the length direction using a stretching test device (X4HD-HT manufactured by Toyo Seiki Seisaku-sho, Ltd.) under the conditions where the stretching rate was 10 cm/min, the stretch ratio was 1.5, and the stretching temperature was 140° C. A retardation film having a retardation of 143 nm was thus obtained (where the measurement wavelength was 550 nm). Re(400)/Re(550) was calculated to evaluate the wavelength dependence of the retardation film. As a result, Re(400)/Re(550) was 1.09. Further, the photoelasticity of the retardation film was 6×10$^{-13}$ cm²/dyn.

Example 2

A sample film of 30 cm×10 cm was cut off the film obtained in Example 1a. Similar to Example 1b, the sample film was subjected to free end lengthwise uniaxial stretching under the conditions where the stretch ratio was 1.9 and the stretching temperature was 140° C. in the length direction. A retardation film having a retardation of 260 nm was thus obtained (where the measurement wavelength was 550 nm). Re(400)/Re(550) was calculated to evaluate the wavelength dependence of the retardation film. As a result, Re(400)/Re(550) was 1.09.

Example 3a 100 parts by weight (91% by weight) of an alternating copolymer consisting of isobutene and N-methyl maleimide used in Example 1a and 10 parts (9% by weight) of a thermoplastic copolymer consisting of styrene and acrylonitrile (containing 27% by weight (42% by mole) of acrylonitrile) were dissolved in methylene chloride, thereby obtaining a solution having a solid concentration of 15% by weight. The solution was flow-expanded on a biaxially stretched polyethylene terephthalate film laid on a glass plate. The resultant sample was left for 60 minutes at room temperature. Thereafter, the sample was peeled off the polyethylene terephthalate film, and the four sides of the sample were fixed and the film was dried for 10 minutes at 100° C. followed by drying for 10 minutes at 140° C. An unstretched film having a thickness of about 100 μm was obtained. The unstretched film had a retardation value of 5 nm, a light transmission of 92%, and a haze of 0.5%.

Example 3b

In a manner similar to that in Example 1b, a sample film obtained in Example 3a was subjected to free end lengthwise uniaxial stretching in the length direction under the conditions where the stretch ratio was 1.5 and the stretching temperature was 150° C. A retardation film having a retardation of 138 nm was thus obtained (where the measurement wavelength was 550 nm). Re(400)/Re(550) was calculated to evaluate the wavelength dependence of the retardation film. As a result, Re(400)/Re(550) was 1.07. Further, the photoelasticity of the retardation film was. 6×10$^{-13}$ cm²/dyn.

Comparative Example 1a

A polycarbonate resin was used (C-1400 manufactured by Teijin Chemicals Ltd. where the glass transition temperature is 149° C.). The bisphenol component of the polycarbonate resin was bisphenol A. The polycarbonate resin was dissolved in methylene chloride, thereby obtaining a solution having a concentration of 15% by weight. The solution was flow-expanded on a biaxially stretched polyethylene terephthalate film laid on a glass plate. The resultant sample was left for 60 minutes at room temperature. Thereafter, the sample was peeled off the polyethylene terephthalate film, and the four sides of the sample were fixed and the film was dried for 10 minutes at 100° C. followed by drying for 10 minutes at 120° C. An unstretched film having a thickness of about 80 μm was obtained. The unstretched film had a retardation value of 21 nm, a light transmission of 90%, and a haze of 0.3%.

Comparative Example 1b

A sample film of 30 cm×10 cm was cut off the unstretched film obtained in Comparative Example 1a. The sample was subjected to stretching using the stretching test device (X4HD-HT manufactured by Toyo Seiki Seisaku-sho, Ltd.) under the conditions where the stretching rate was 10 cm/min, the stretch ratio was 1.1, and the stretching temperature was 165° C. A retardation film having a retardation of 250 nm was thus obtained (where the measurement wavelength was 550 nm). Re(400)/Re(550) was calculated to evaluate the wavelength dependence of the retardation film. As a result, Re(400)/Re(550) was 1.16.

Example 4

100 parts by weight of an alternating copolymer consisting of isobutene and N-methyl maleimide (containing 50% by mole of N-methyl maleimide, the glass transition temperature was 157° C.) and 33 parts (25% by weight) of a thermoplastic copolymer consisting of styrene and acrylonitrile (containing 74% by weight of styrene and 26% by weight of acrylonitrile) were dissolved in methylene chloride, thereby obtaining a solution having a solid concentration of 15% by weight. The solution was flow-expanded on a biaxially stretched polyethylene terephthalate film laid on a glass plate. The resultant sample was left for 60 minutes at room temperature. Thereafter, the sample was peeled off the polyethylene terephthalate film, and the four sides of the sample were fixed and the film was dried for 10 minutes at 100° C. followed by drying for 10 minutes at 140° C. and further followed by drying for 30 minutes at 160° C. An unstretched film having a thickness of about 100 μm was obtained. A variation in thickness of the unstretched film was 2% with respect to the average thickness. The unstretched film had a retardation value of 3 nm, an alignment retardation of 6 nm, a light transmission of 92%, and a haze of 0.3%. The film also had a tear propagation strength of 123 gf/mm, and a folding endurance of 7 times. Further, the film had a retardation of 3 nm in the thickness direction. The glass transition temperature of the film was 145° C.

Examples 5 to 12 and Comparative Examples 2 and 3

Films were obtained in a manner similar to Example 1 except that the percentages by weight of the content of acrylonitrile and the content of a thermoplastic copolymer consisting of styrene and acrylonitrile were varied. Characteristics of the resultant film are shown in Table 2.

Comparative Example 4

A film of alternating copolymer consisting of isobutene and N-methylmaleimide was obtained in a manner similar to Example 1b except that a thermoplastic copolymer consisting of styrene and acrylonitrile was not used. Characteristics of the resultant film are shown in Table 2.

Comparative Example 5

A polycarbonate resin (C-1400 manufactured by Teijin Chemicals Ltd., the glass transition temperature is 149° C.) was dissolved in methylene chloride, thereby obtaining a solution having a solid concentration of 15% by weight. The solution was flow-expanded on a biaxially stretched polyethylene terephthalate film laid on a glass plate. The resultant sample was left for 60 minutes at room temperature. Thereafter, the sample was peeled off the polyethylene terephthalate film, and the four sides of the sample were fixed and the film was dried for 10 minutes at 100° C. followed by drying for 10 minutes at 120° C. An unstretched film having a thickness of about 80 μm was obtained. The unstretched film had a retardation value of 21 nm, a light transmission of 90%, and a haze of 0.3%. The alignment retardation of the film was about 1400 nm. The wavelength dependence R of the film was 1.16. Such a wavelength dependence is significantly larger than that of each Example.

Example 13

75 parts by weight of an alternating copolymer consisting of isobutene and N-methyl maleimide (containing 50% by mole of N-methyl maleimide, the glass transition temperature was 157° C.) and 25 parts by weight of an acrylonitrile-styrene copolymer (containing 28% by weight of acrylonitrile) (I/P ratio=2.46) were dissolved in methylene chloride, thereby obtaining a solution having a solid concentration of 15% by weight. The solution was flow-expanded on a biaxially stretched polyethylene terephthalate film laid on a glass plate. The resultant sample was left for 60 minutes at room temperature. Thereafter, the sample was peeled off the polyethylene terephthalate film, and the four sides of the sample were fixed and the film was dried for 10 minutes at 100° C. followed by drying for 10 minutes at 140° C. and further followed by drying for 30 minutes at 160° C. A film was obtained. The film had a retardation value of 4 nm in a plane direction of the film and a retardation of 4 nm in a thickness direction of the film, a light transmission of 92%, and a haze of 0.3%. The glass transition temperature of the film was 147° C. The film also had a folding endurance of 5 times in the MD direction (flow-expanding direction) and a folding endurance of 6 times in the TD direction (a direction perpendicular to the flow-expanding direction). The film also had a tear propagation strength of 79 gf/mm in the MD direction and a tear propagation strength of 76 gf/mm in the TD direction. Note that the flow-expanding direction is herein referred to as "MD direction" and a direction perpendicular to the flow-expanding direction is referred to as "TD direction".

Example 14

A film produced in a manner similar to that in Example 13 was stretched by a factor of 1.5 in the MD direction at 160° C. This film had a haze of 0.4%. The film also had a retardation of 5 nm in a plane direction of the film and a retardation of 7 nm in the thickness direction of the film. The folding endurance of the film was 5 times in the MD direction and 173 times in the TD direction. The tear propagation strength of the film was 62 gf/mm in the MD direction and 177 gf/mm in the TD direction.

Example 15

A film produced in a manner similar to that in Example 13 was stretched by a factor of 1.5 in the MD direction at 160° C. and thereafter stretched by a factor of 1.5 in the TD direction at 160° C. This film had a haze of 0.4%. The film also had a retardation of 4 nm in a plane direction of the film and a retardation of 11 nm in the thickness direction of the film. The folding endurance of the film was 161 times in the MD direction and 133 times in the TD direction. The tear propagation strength of the film was 151 gf/mm in the MD direction and 148 gf/mm in the TD direction.

Examples 16 to 18 and Comparative Example 6

A film was obtained in a manner similar to that in Example 14 except that the number of parts by weight and stretching conditions of the thermoplastic copolymer consisting of acrylonitrile and styrene were modified. The composition and stretching conditions of the film are shown in Table 3. Characteristics of the resultant film are shown in Table 4.

Example 19

100 parts by weight (70% by weight) of an alternating copolymer consisting of isobutene and N-methyl maleimide (containing 50% by mole of N-methyl maleimide, the glass transition temperature was 157° C.) and 43 parts (30% by weight) of a thermoplastic copolymer of styrene and acrylonitrile (containing 73% by weight of styrene and 27% by weight of acrylonitrile) were used to obtain a film in a manner similar to that in Example 1a.

A sample film of 30 cm×10 cm was cut off the obtained film. The sample film was subjected to free end lengthwise uniaxial stretching using the stretching test device (X4HD-HT manufactured by Toyo Seiki Seisaku-sho, Ltd.) where the stretching rate was 10 cm/min, the stretch ratio was 1.5, and the stretching temperature was 150° C. The resultant uniaxially stretched film had a retardation of 3 nm in a plane direction of the film and a retardation of 3 nm in the thickness direction of the film. The film had alight transmission of 92% and a haze of 0.4%. The stretched film having a thickness of 45 μm had a film tear propagation strength of 192 gf/mm in the direction perpendicular to the stretching direction and a folding endurance in the stretching direction of 218 times (where the stretching direction is the length direction of the sample).

Example 20

A uniaxially stretched film was obtained in a manner similar to that in Example 19. Thereafter, the film was stretched in a direction perpendicular to the previous stretching direction, thereby obtaining a sequentially, biaxially stretched film having a thickness of 50 μm. The tear propagation strength of the film was 151 gf/mm in a direction perpendicular to the second stretching direction. The folding endurance of the film was 121 times. The retardation of the film was 3 nm in a plane direction of the film and 3 nm in the thickness direction of the film.

Examples 21 to 24

Films were obtained in a manner similar to that in Example 19 except that the content of acrylonitrile and the content of the thermoplastic copolymer consisting of styrene and acrylonitrile were varied. Each film was sequentially biaxially stretched by a stretch ratio of 1.5 at the glass transition temperature of the film in a manner similar to that of Example 20. Characteristics of the resultant film are shown in Table 5. The tear propagation strength in Table 5 indicates the values of the tear propagation strength in a direction perpendicular to the second stretching direction. The folding endurance on Table 5 indicates the values of the folding endurance which was measured where the second stretching direction is the length direction of the sample.

Example 25

A stretched film was obtained by uniaxial stretching with a stretch ratio of 2 in a manner similar to that in Example 19 except that the content of acrylonitrile and the content consisting of the thermoplastic copolymer of styrene and acrylonitrile were changed. The stretched film has a thickness of 55 μm and a retardation. Characteristics of the film are shown in Table 5.

Example 26

100 parts by weight (70% by weight) of an alternating copolymer consisting of isobutene and N-methyl maleimide (containing 50% by mole of N-methyl maleimide, the glass transition temperature was 157° C.) and 43 parts (30%: by weight) of a thermoplastic copolymer consisting of styrene and acrylonitrile (containing 73% by weight of styrene and 27% by weight of acrylonitrile) were subjected to melt kneading to produce pellets. The pellets were supplied to a melt extruder having a T-die to obtain a film having a thickness of 100 μm. The retardation value of the film was 8 nm. The alignment retardation of the film was 38 nm. The film had a light transmission of 92% and a haze of 0.7%. The film also had a tear propagation strength of 123 gf/mm and a folding endurance of 7 times. The glass transition temperature of the film was 137° C.

Examples 27 to 31 and Comparative Examples 7 to 9

Films were obtained in a manner similar to that in Example 26 except that the content of acrylonitrile and the content of the thermoplastic resin consisting of styrene and acrylonitrile were varied. Characteristics of the obtained film are shown in Table 4.

Example 32

The film obtained in Example 27 was stretched in the MD direction (flow-expanding direction) by a factor of 1.5 at 160° C. The surface energy of the film was 46 dyne/cm.

The film was subjected to corona treatment using a discharge bar having a length of 25 cm under the following conditions: 40 V, 3A, and a line speed of 1 m/min. The resultant film had a haze of 0.4%. The retardation of the film was 5 nm in a plane direction of the film and 7 nm in the thickness direction of the film. The folding endurance of the film was 5 times in the MD direction and 173 times in the TD direction (the direction perpendicular to the flow-expanding direction). The tear propagation strength of the film was 62 gf/mm in the MD direction and 177 gf/mm in the TD direction. The photoelasticity of the film was. $6 \times 10^{-13}$ cm$^2$/dyne. The surface energy of the film after the corona treatment followed by storage for 3 days was 56 dyne/cm. The film was left for a long period of time at room temperature. The surface energy of the film after 10 days was 54 dyne/cm. The surface energy of the film after 20 days was 54 dyne/cm. The surface energy of the film after 70 days was 53 dyne/cm. Thus, the surface energy of the obtained film was stable for a long time of period.

Example 33

An unstretched film produced by a method similar to that in Example 32 was stretched at 160° C. by a factor of 1.5 in the MD direction and thereafter stretched by a factor of 1.5 in the TD direction at 160° C. The surface energy of the film was 46 dyne/cm.

The film was treated with an atmospheric pressure plasma of mixed gas having the same volume of argon and helium and 2% of oxygen, for 10 seconds, using a high frequency power source of 5 kHz-150 w. The resultant film had a haze of 0.4%. The retardation of the film was 4 nm in a plane direction of the film and 11 nm in the thickness direction. The folding endurance of the film was 161 times in the MD direction and 133 times in the TD direction. The tear propagation strength of the film was 151 gf/mm in the MD direction and 148 gf/mm in the TD direction. The surface energy of the film after storage of the obtained film for 3 days was 59 dyne/cm. The film was left for a long period of time at room temperature. The surface energy of the film after 10 days was 57 dyne/cm. The surface energy of the film after 20 days was 55 dyne/cm. The surface energy of the film after 70 days was 54 dyne/cm. Thus, the surface energy of the obtained film was stable for a long time of period.

Comparative Example 10

A cycloolefin type resin (ZEONOR 1420R manufactured by Nippon Zeon Co., Ltd.) was dissolved in xylene to obtain a dope having a resin concentration of 35% by weight. The obtained dope was cast on a biaxially stretched polyethylene terephthalate film using a bar coater, followed by storage for 60 minutes at room temperature and further followed by drying at 80° C. for 12 minutes, thereby obtaining a film (Tg (glass transition temperature)=127° C.).

The obtained film was stretched in the MD direction by a factor of 1.5 at 150° C. The resultant film had a haze of 0.4%. The retardation of the film was 38 nm in a plane direction of the film and 66 nm in a thickness direction of the film. The folding endurance of the film was 216 times in the MD direction and 389 times in the TD direction. The tear propagation strength of the film was 178 gf/mm in the MD direction and 210 gf/mm in the TD direction. The photoelasticity of the film was $5 \times 10^{-13}$ cm$^2$/dyne. The surface energy of the film was 42 dyne/cm.

Similar to Example 33, the film was subjected to the plasma treatment. The surface energy of the obtained film 3 days after the plasma treatment followed was 54 dyne/cm. The film was left for a long period of time at room temperature. The surface energy of the film after 10 days was 47 dyne/cm. The surface energy of the film after 20 days was 45 dyne/cm. The surface energy of the film after 70 days was 44 dyne/cm. Thus, the surface energy of the obtained film was significantly reduced.

Example 34

A roll film having a width of 450 nm and a length of 200 m was obtained in accordance with Example 27. Using this roll film, lengthwise stretching by a factor of 2 was conducted at 150° C. using 6 rolls where the distance between each roll was 1 cm. The resultant films were further stretched by a factor of 2 at 150° C. using a tenter. The surface energy of the films was 46 dyne/cm. A coextruded film of polyethylene and partially saponified vinyl acetate having a thickness of 50 μm was attached as a protection film to a single side of the film.

Further, the attached films were passed at a line speed of 1.8 m/min through the atmospheric pressure plasma of a mixture gas consisting of equal volumes of argon and helium and 2% of oxygen using a high-frequency power source of 5 kHz-4 kw, thereby subjecting one side of the films to surface treatment.

The resultant film had a haze of 0.8%. The retardation of the film was 0 nm in a plane direction of the film and 0 nm in the thickness direction of the film. The folding endurance of the film was 112 times in the MD direction and 145 times in the TD direction. The tear propagation strength of the film was 252 gf/mm in the MD direction and 194 gf/mm in the TD direction. The surface energy of the film after storage of the obtained film for 3 days was 60 dyne/cm. The film was left for a long period of time at room temperature. As a result, the surface energy of the film after 10 days was 55 dyne/cm. The surface energy of the film after 20 days was 54 dyne/cm. The surface energy of the film after 70 days was 54 dyne/cm. Thus, the surface energy of the obtained film was stable for a long time of period.

Example 35

The surface energy of the film obtained in Example 18 was measured. The surface energy of the film was 46 dyne/cm.

A surface of the film obtained in Example 18 was subjected to corona treatment in accordance with Example 32. The resultant film had a haze of 0.5%. The retardation of the film was 4 nm in a plane direction of the film and 28 nm in the thickness direction of the film. The mechanical strength of the film after the treatment was almost the same as that before the treatment. The surface energy of the film after storage of the film for 3 days was 58 dyne/cm. The film was left for a long period of time at room temperature. The surface energy of the film after 10 days was 54 dyne/cm. The surface energy of the film after 20 days was 53 dyne/cm. The surface energy of the film after 70 days was 52 dyne/cm. Thus, the surface energy of the obtained film was stable for a long time of period.

Example 36

The retardation film obtained in Example 1b was subjected to corona treatment under the conditions of Example 32. As a result, the surface energy of the corona-treated surface of the film was 56 dyne/cm. The polarization axis of a polarization plate and the slow axis of the corona-treated retardation film were arranged so as to attain an angle of 45°. The polarization plate was provided on the corona-treated surface, both being attached to each other using an acryl type adhesive. Thus, a circular polarization plate was obtained. The circular polarization plate was left under an environment where temperature was 40° C. and humidity was 95%, for 70 days. Peel at the interface between the polarization plate and the retardation film was not observed.

TABLE 1

| | Nitrile content* Wt % | Resin B content Wt % | Stretching temperature ° C. | Stretch ratio fold | Light transmission % | Haze % | Retardation nm | Wavelength dependence R | Photoelasticity cm$^2$/dyn |
|---|---|---|---|---|---|---|---|---|---|
| Example 1a | 24 | 10 | — | — | 92 | 0.3 | 8 | — | — |
| Example 1b | 24 | 10 | 140 | 1.5 | — | — | — | 1.09 | $6 \times 10^{-13}$ |
| Example 2 | 24 | 10 | 140 | 1.9 | — | — | — | 1.09 | — |
| Example 3a | 27 | 9 | — | — | 92 | 0.5 | 5 | — | — |
| Example 3b | 27 | 9 | 150 | 1.5 | — | — | 138 | 1.07 | $6 \times 10^{-13}$ |

TABLE 1-continued

|  | Nitrile content* Wt % | Resin B content Wt % | Stretching temperature ° C. | Stretch ratio fold | Light transmission % | Haze % | Retardation nm | Wavelength dependence R | Photoelasticity cm²/dyn |
|---|---|---|---|---|---|---|---|---|---|
| Comparative Example 1a | — | 0 | — | — | 90 | 0.3 | 21 | — | — |
| Comparative Example 1b | — | 0 | 165 | 1.1 | — | — | 250 | 1.16 | — |

Note)
*the content of nitrile unit in the thermoplastic resin B

TABLE 2

|  | Nitrile content Wt % | Resin B content Wt % | Light transmission % | Haze % | Retardation nm | Retardation in thickness direction nm | Alignment retardation nm | Wavelength dependence R |
|---|---|---|---|---|---|---|---|---|
| Example 4 | 26 | 25 | 92 | 0.3 | 3 | 3 | 6 | — |
| Example 5 | 24 | 10 | 92 | 0.7 | 5 | 3 | 217 | 1.09 |
| Comparative Example 2 | 24 | 15 | 87 | 3.0 | — | — | — | — |
| Example 6 | 26 | 20 | 92 | 0.4 | 5 | 4 | 80 | 1.04 |
| Example 7 | 26 | 30 | 92 | 0.4 | 4 | 1 | 18 | — |
| Example 8 | 26 | 50 | 91 | 0.3 | 5 | — | 140 | — |
| Example 9 | 26 | 70 | 90 | 0.3 | 6 | — | — | — |
| Example 10 | 26 | 90 | 90 | 0.4 | 7 | — | 197 | — |
| Example 11 | 28 | 20 | 92 | 0.4 | 5 | — | — | 1.04 |
| Example 12 | 28 | 70 | 91 | 0.3 | 7 | — | — | — |
| Comparative Example 3 | 28 | 85 | 85 | 4.1 | — | — | — | — |
| Comparative Example 4 | — | 0 | 92 | 0.3 | 6 | 5 | 529 | — |
| Comparative Example 5 | — | — | 90 | 0.3 | 21 | — | 1400 | 1.16 |

TABLE 3

|  | Resin A:B (weight ratio) | Content of nitrile-containing monomer in resin B (weight %) | Stretching condition MD direction | Stretching condition TD direction |
|---|---|---|---|---|
| Example 13 | 75:25 | 28 | — | — |
| Example 14 | 75:25 | 28 | 160° C. 1.5 fold | — |
| Example 15 | 75:25 | 28 | 160° C. 1.5 fold | 160° C. 1.5 fold |
| Example 16 | 70:30 | 26 | 150° C. 1.5 fold | — |
| Example 17 | 70:30 | 26 | 150° C. 1.5 fold | 150° C. 1.5 fold |
| Example 18 | 70:30 | 26 | 150° C. 2.0 fold | 150° C. 2.0 fold |
| Comparative Example 6 | 100:0 | — | 170° C. 1.5 fold | — |

TABLE 4

|  | Film thickness (μm) | Light transmission (%) | Haze (%) | Retardation (nm) | Retardation in thickness direction (nm) | Tear propagation strength (gf/mm) MD/TD | Folding endurance (times) MD/TD |
|---|---|---|---|---|---|---|---|
| Example 13 | 50 | 92 | 0.3 | 4 | 4 | 79/76 | 5/6 |
| Example 14 | 47 | 92 | 0.4 | 5 | 7 | 62/177 | 5/173 |
| Example 15 | 46 | 92 | 0.4 | 4 | 11 | 151/148 | 161/133 |

TABLE 4-continued

|  | Film thickness (μm) | Light transmission (%) | Haze (%) | Retardation (nm) | Retardation in thickness direction (nm) | Tear propagation strength (gf/mm) MD/TD | Folding endurance (times) MD/TD |
|---|---|---|---|---|---|---|---|
| Example 16 | 52 | 92 | 0.4 | 4 | 9 | 90/169 | 12/215 |
| Example 17 | 48 | 91 | 0.5 | 4 | 22 | 183/132 | 205/148 |
| Example 18 | 49 | 91 | 0.5 | 4 | 32 | 172/163 | 199/205 |
| Comparative Example 6 | 50 | 93 | 0.5 | 190 | 201 | 68/123 | 3/101 |

TABLE 5

|  | Nitrile content Wt % | Resin B content Wt % | Light transmission % | Haze % | Retardation nm | Retardation in thickness direction (nm) | Folding endurance (times) | Tear propagation strength gf/mm | Wavelength dependence R |
|---|---|---|---|---|---|---|---|---|---|
| Example 19 | 27 | 30 | 92 | 0.4 | 3 | 3 | 218 | 192 | — |
| Example 20 | 27 | 30 | 92 | 0.5 | 3 | 3 | 121 | 151 | — |
| Example 21 | 24 | 20 | 92 | 0.3 | 6 | 151 | 108 | 179 | — |
| Example 22 | 27 | 40 | 92 | 0.4 | 5 | 29 | 181 | 221 | — |
| Example 23 | 27 | 45 | 92 | 0.4 | 4 | 95 | 215 | 169 | — |
| Example 24 | 29 | 33 | 92 | 0.7 | 6 | 90 | 177 | 252 | — |
| Example 25 | 27 | 30 | 92 | 0.5 | 90 | 46 | 252 | 292 | 1.04 |

TABLE 6

|  | Nitrile content Wt % | Resin B content Wt % | Light transmission % | Haze % | Retardation nm | Alignment retardation nm | Wavelength dependence R |
|---|---|---|---|---|---|---|---|
| Example 26 | 27 | 30 | 92 | 0.7 | 8 | 38 | — |
| Example 27 | 24 | 10 | 92 | 0.7 | 7 | 246 | 1.09 |
| Comparative Example 7 | 24 | 20 | 88 | 3.5 | — | — | — |
| Example 28 | 27 | 40 | 92 | 0.8 | 4 | 50 | — |
| Example 29 | 27 | 70 | 90 | 0.8 | 5 | 175 | — |
| Example 30 | 27 | 90 | 90 | 0.4 | 7 | 197 | — |
| Example 31 | 28 | 30 | 92 | 0.6 | 5 | — | 1.04 |
| Comparative Example 8 | 29 | 40 | 85 | 4.0 | 7 | — | — |
| Comparative Example 9 | 28 | 85 | 85 | 5.3 | — | — | — |

TABLE 7

|  | Film used | Stretching condition MD | Stretching condition TD | Surface treatment |
|---|---|---|---|---|
| Example 32 | Example 27 | 160° C. 1.5 fold | — | Corona |
| Example 33 | Example 32 | 160° C. 1.5 fold | 160° C. 1.5 fold | Plasma |
| Comparative Example 10 | ZEONOR* | 150° C. 1.5 fold | — | Plasma |
| Example 34 | Example 27 | 150° C. 2 fold | 150° C. 2 fold | Plasma |
| Example 35 | Example 18 | 150° C. 2 fold | 150° C. 2 fold | Corona |

Note)
*film made of cycloolefin type resin (Zeonor 1420R manufactured by Nippon Zeon Co., Ltd.)

TABLE 8

| | Haze % | In-plane retardation nm | Retardation in thickness direction nm | Folding endurance MD | Folding endurance TD | Tear propagation strength MD | Tear propagation strength TD | Photo-elasticity coefficient |
|---|---|---|---|---|---|---|---|---|
| Example 32 | 0.4 | 5 | 7 | 5 | 173 | 62 | 177 | $6 \times 10^{-13}$ |
| Example 33 | 0.4 | 4 | 11 | 161 | 133 | 151 | 148 | — |
| Comparative Example 10 | 0.4 | 38 | 66 | 216 | 389 | 178 | 210 | $5 \times 10^{-13}$ |
| Example 34 | 0.8 | 0 | 0 | 112 | 145 | 252 | 194 | — |
| Example 35 | 0.5 | 4 | 28 | — | — | — | — | — |

TABLE 9

| | Surface energy (dyne/cm) | | | | |
|---|---|---|---|---|---|
| | Before treatment | 3 days after | 10 days after | 20 days after | 70 days after |
| Example 32 | 46 | 56 | 54 | 54 | 53 |
| Example 33 | 46 | 59 | 57 | 55 | 54 |
| Comparative Example 10 | 42 | 54 | 47 | 45 | 44 |
| Example 34 | 46 | 60 | 55 | 54 | 54 |
| Example 35 | 46 | 58 | 54 | 53 | 52 |

INDUSTRIAL APPLICABILITY

Effects of the Invention

According to the present invention, a transparent film having a small retardation is obtained by using polymer having a specific structure and composition. The film of the present invention has an advantage in which a retardation due to molecule alignment is unlikely to occur. According to the present invention, a retardation can be adjusted to be a desired value by appropriately adjusting the composition ratio of resins used in a film. Further, an optical film according to the present invention has an advantage in which measurement wavelength dependence can be easily controlled.

What is claimed is:

1. A transparent film comprising:

(A) a thermoplastic resin having a substituted or non-substituted imide group at a side chain of the resin; and (B) a thermoplastic resin having a substituted or non-substituted phenyl group and a nitrile group at a side chain of the resin, wherein a retardation value of the film is from 0 to 1000 nm, a light transmission of the film is 85% or more, and a haze of the film is 2% or less.

2. A film according to claim 1, wherein the thermoplastic resin A consists of an olefin repeating unit, and a repeating unit having a substituted or non-substituted imide group at a side chain of the resin.

3. A film according to claim 1, wherein the retardation value is less than 20 nm.

4. A film according to claim 1, wherein the retardation value is 20 nm or more.

5. A film according to claim 1, wherein an alignment retardation value of the film is 300 nm or less.

6. A film according to claim 1, wherein the film is a stretched film.

7. A film according to claim 1, wherein a folding endurance of the film is 30 times or more in at least one direction in a plane of the film.

8. A film according to claim 1, wherein a tear propagation strength of the film is 150 gf/mm or more in at least one direction in a plane of the film.

9. A film according to claim 1, wherein a surface energy of at least one surface of the film is 50 dyne/cm or more.

10. A film according to claim 3, wherein a retardation of the film in a thickness direction of the film is 50 nm or less.

11. A film according to claim 1, wherein the thermoplastic resin A includes a repeating unit represented by the following formula (1), and another repeating unit represented by the following formula (2):

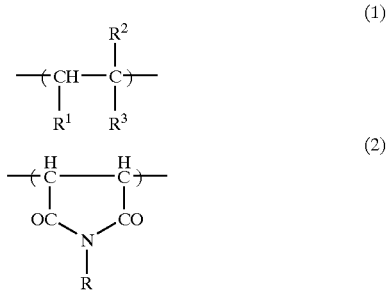

(where $R^1$, $R^2$ and $R^3$ independently indicate a hydrogen atom or an alkyl group having 1 to 8 carbon atoms, and R indicates an alkyl group having 1 to 18 carbon atoms or a cycloalkyl group having 3 to 12 carbon atoms), and wherein the content of the thermoplastic resin A is 50 to 90% by weight with reference to the weight of overall resins in the film.

12. A film according to claim 1, wherein the thermoplastic resin B has a substituted or non-substituted acrylonitrile repeating unit and a substituted or non-substituted styrene repeating unit, the substituted or non-substituted acrylonitrile repeating unit is 20 to 50% by weight of the thermoplastic resin B, and the substituted or non-substituted styrene repeating unit is 50 to 80% by weight of the thermoplastic resin B.

13. A method for producing a film according to claim 1, the method comprising the steps of:

flow-expanding a solution containing the thermoplastic resin A and the thermoplastic resin B on a support; and drying the solution.

14. An elliptical polarization plate comprising a retardation film according to claim 4 and a polarization plate, wherein the film and the polarization plate are laminated.

15. A circular polarization plate comprising a retardation film according to claim 4 and a polarization plate, wherein the film and the polarization plate are laminated.

16. A polarization plate comprising a polarizer and a protection film protecting at least one side of the polarizer, wherein the protection film is a film according to claim 1.

* * * * *